United States Patent

[11] 3,630,402

[72] Inventor Robert R. Young
 Danville, Calif.
[21] Appl. No. 842,158
[22] Filed July 16, 1969
[45] Patented Dec. 28, 1971
[73] Assignee Kaiser Industries Corporation
 Oakland, Calif.
 Continuation-in-part of application Ser. No. 717,174, Mar. 29, 1968, now Patent No. 3,543,952. This application July 16, 1969, Ser. No. 842,158

[54] CRANE FOR HANDLING CONTAINERS
 15 Claims, 21 Drawing Figs.
[52] U.S. Cl. .................................................. 214/730,
 214/38 CA, 294/67 DA
[51] Int. Cl. .................................................. B66f 9/14
[50] Field of Search .......................................... 214/16.4,
 16.42, 730; 194/67 DA, 81

[56] References Cited
UNITED STATES PATENTS

| | | | |
|---|---|---|---|
| 2,788,905 | 3/1957 | Grove | 214/16.1 |
| 2,899,088 | 8/1959 | Corbin | 214/75 |
| 2,901,129 | 8/1959 | Sandeis | 214/16.1 (4) |
| 3,294,260 | 12/1966 | Frangos | 214/16.1 (4-E) |
| 3,302,967 | 2/1967 | Harris et al. | 294/81 |
| 3,439,815 | 4/1969 | Wagner et al. | 214/730 X |
| 3,447,697 | 6/1969 | Morey et al. | 214/16 B X |

Primary Examiner—Gerald M. Forlenza
Assistant Examiner—Raymond B. Johnson
Attorneys—James E. Toomey, Paul E. Calrow and Harold L. Jenkins ABSTRACT: Apparatus for handling large heavy containers and similar loads and especially for transferring the same among the compartments of a vertical array of compartments and a separate transfer station and more particularly a crane for picking up and depositing such loads outside of a compartment, for inserting such loads into the compartments and depositing the same therein, and for picking up the loads within the compartments and removing the same therefrom.

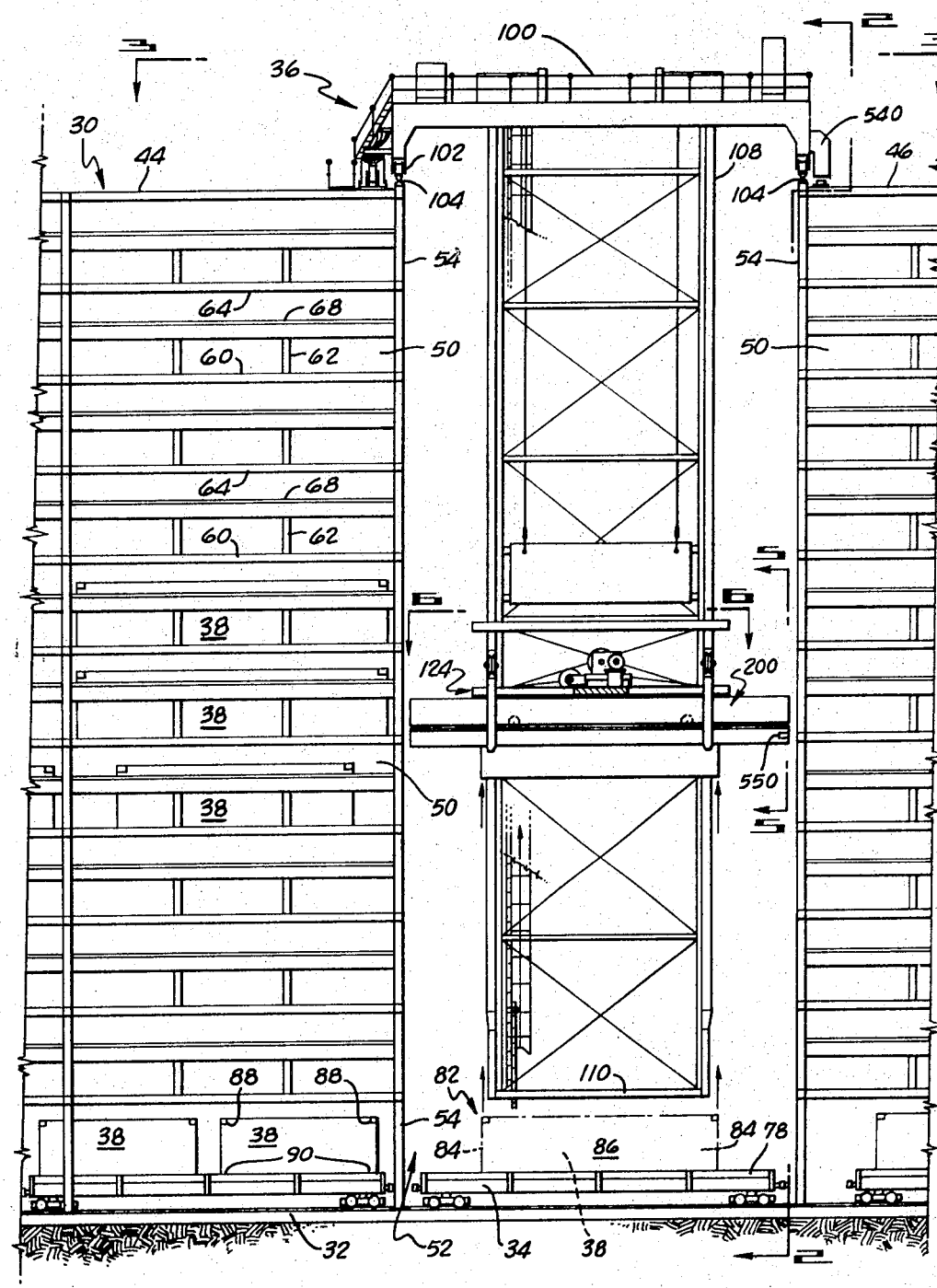
FIG_1

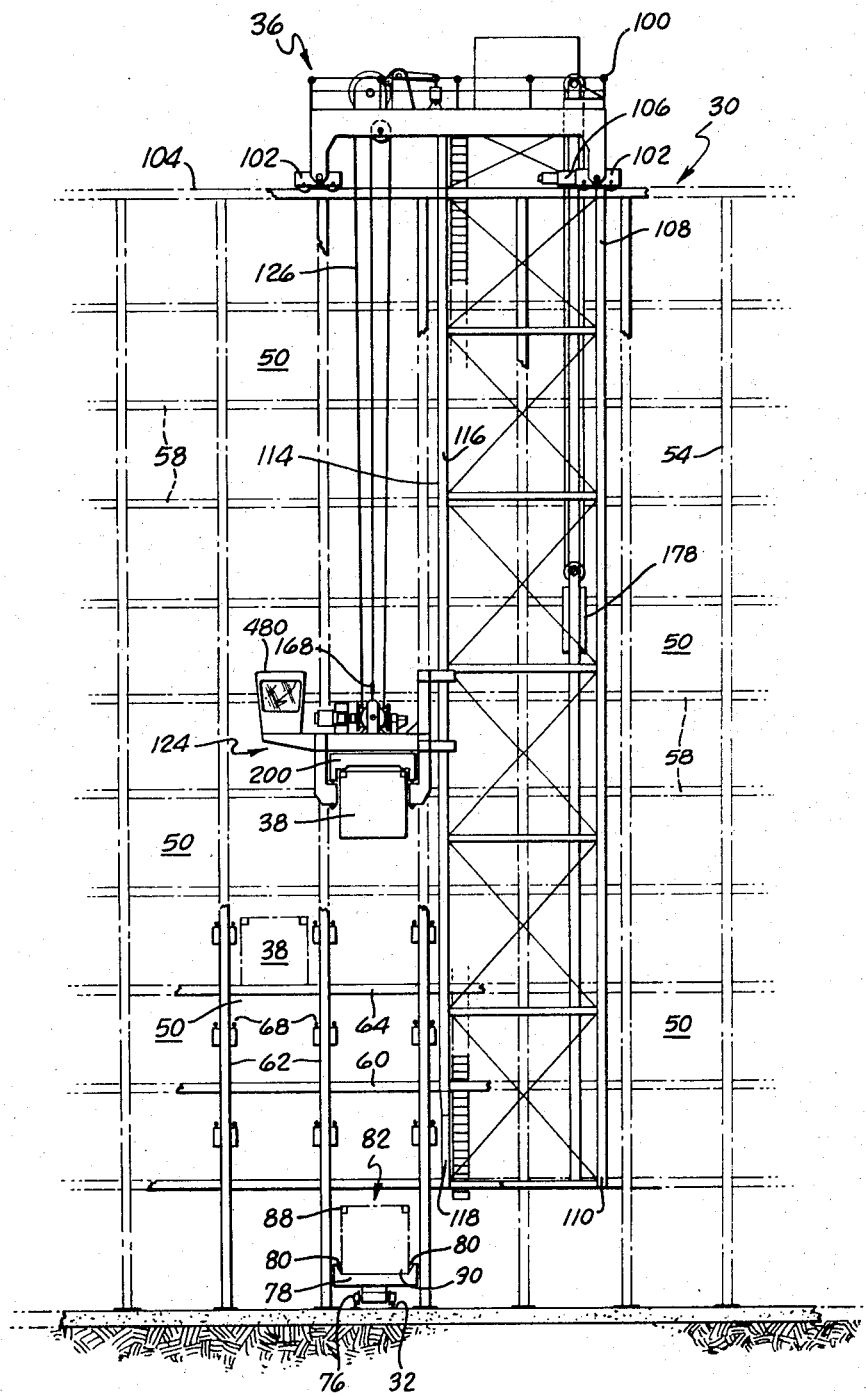

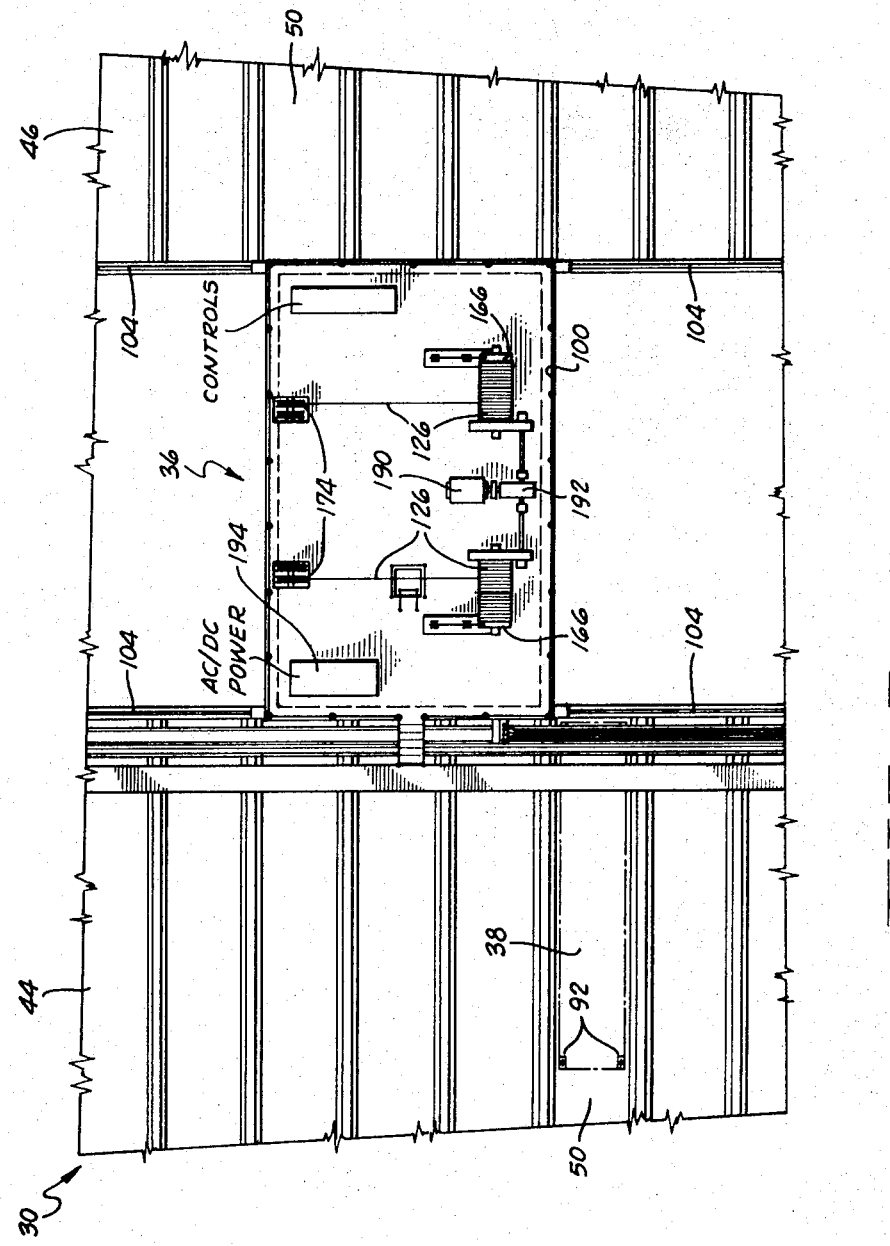

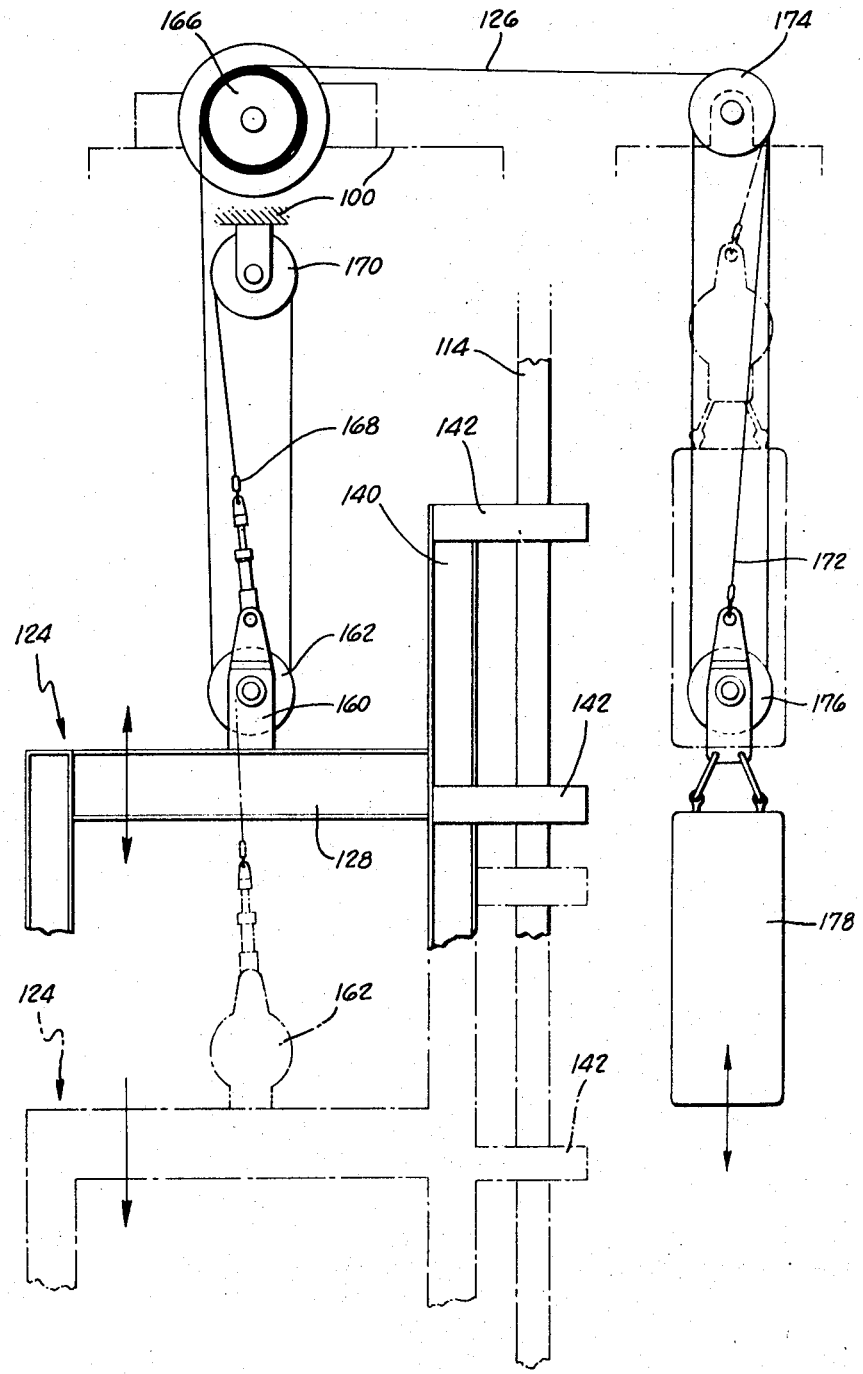

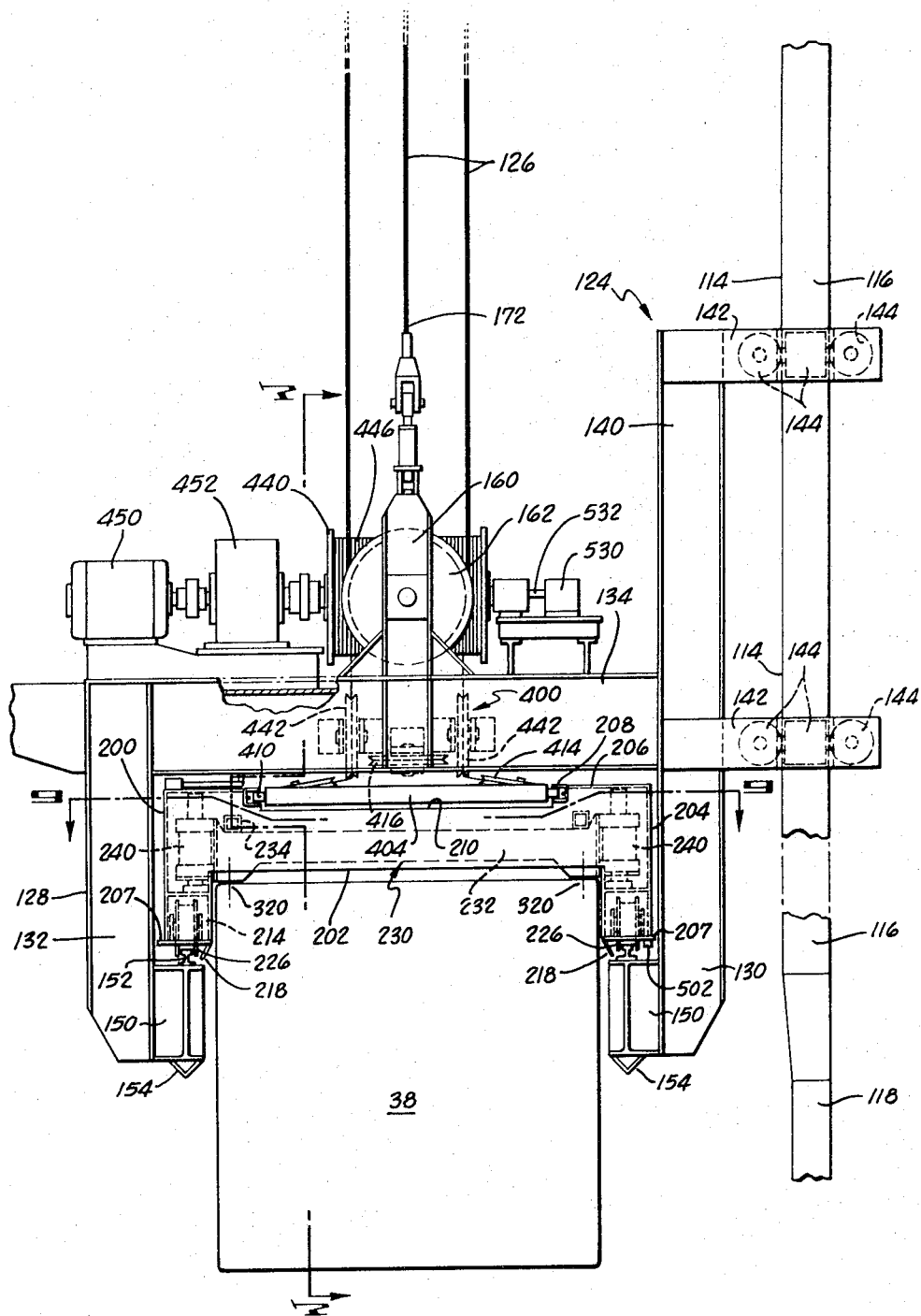

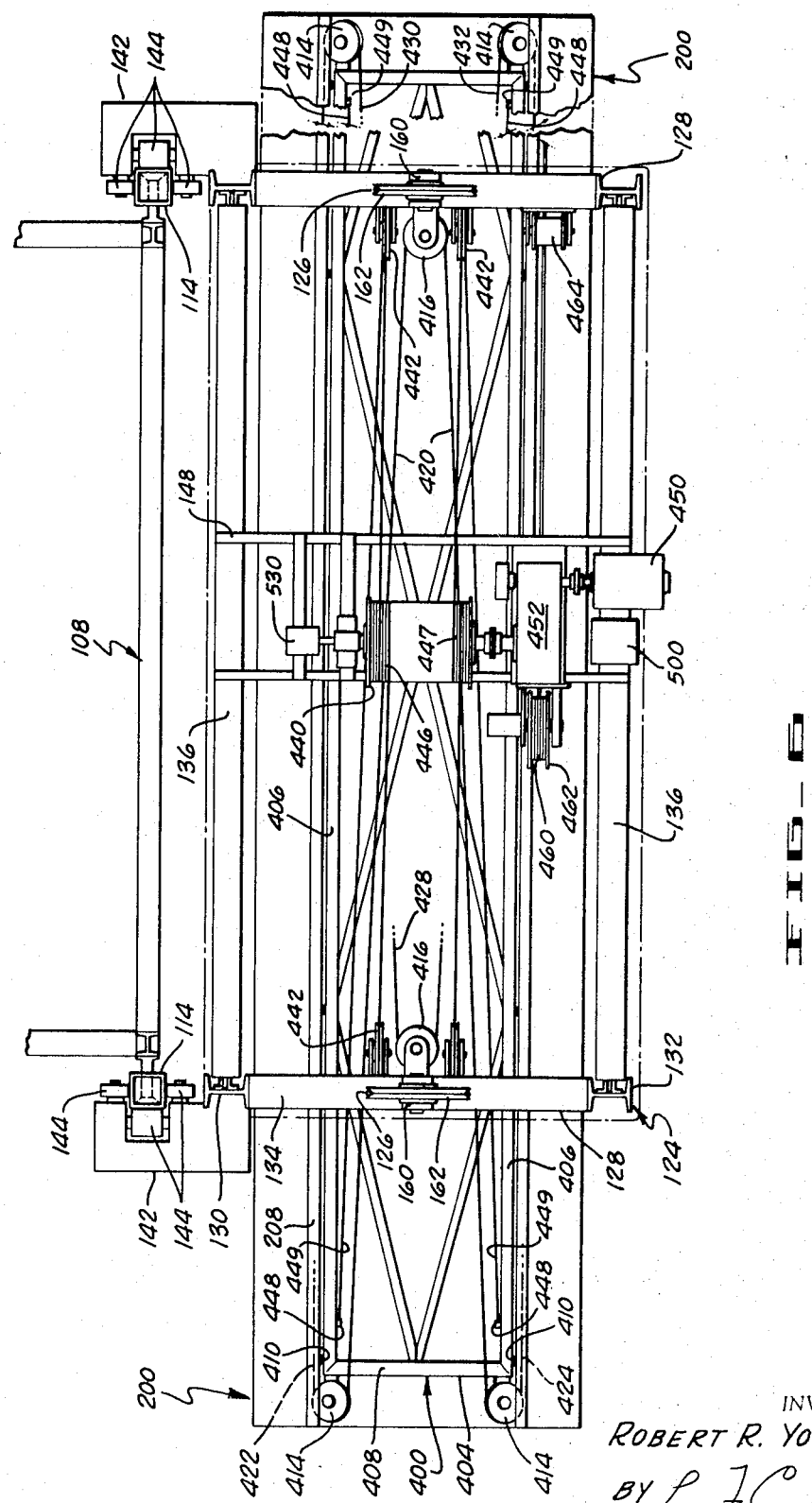

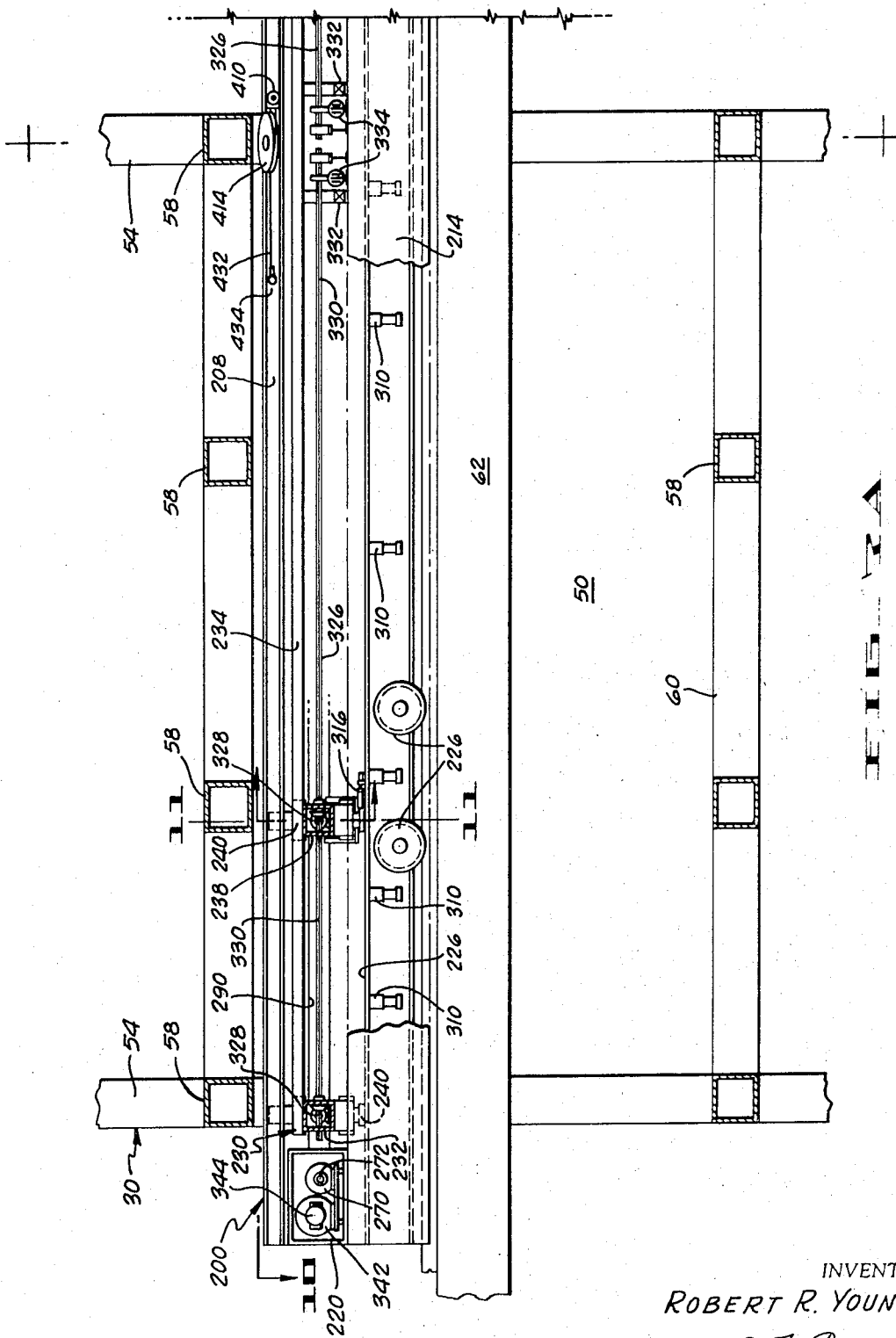

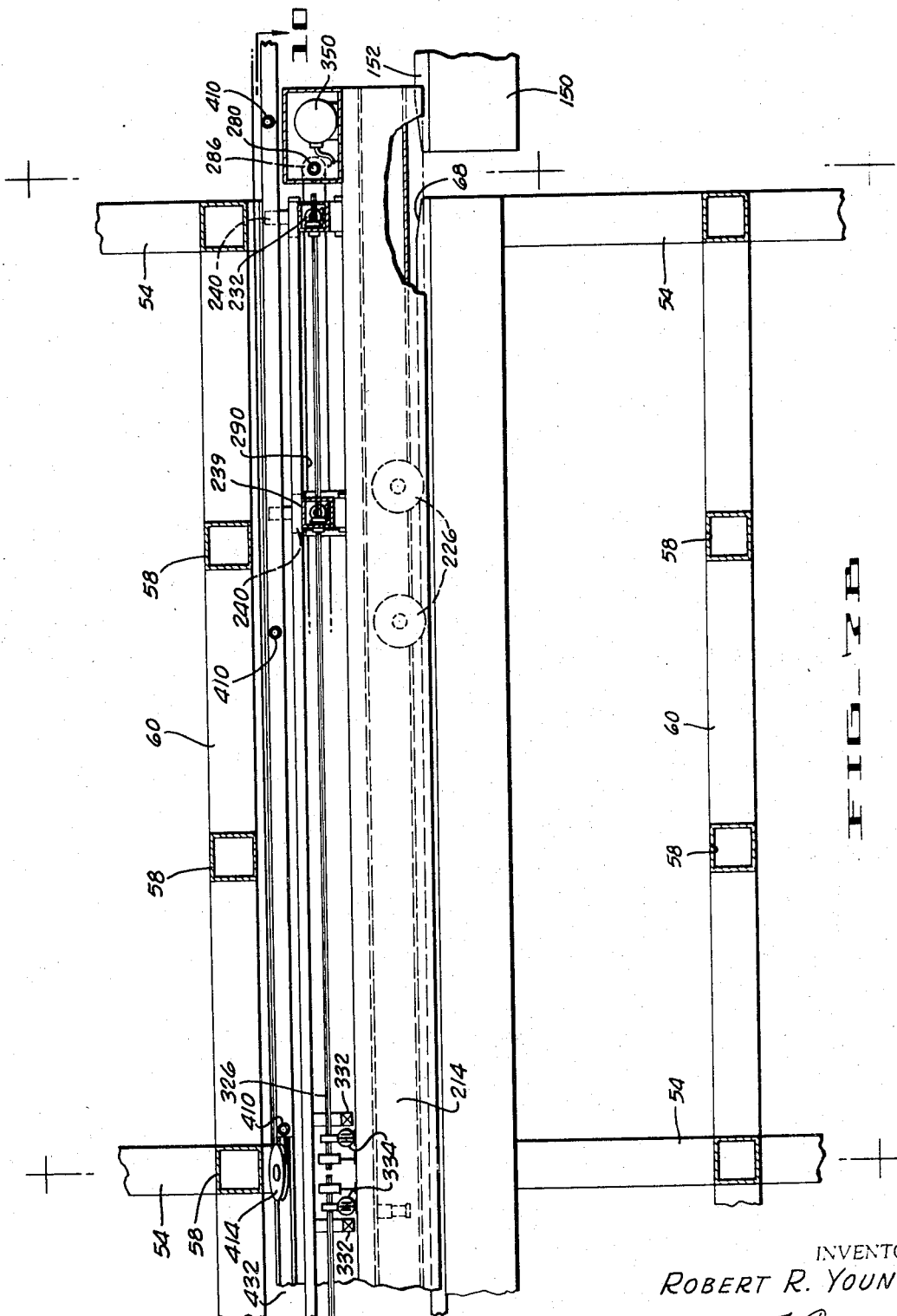

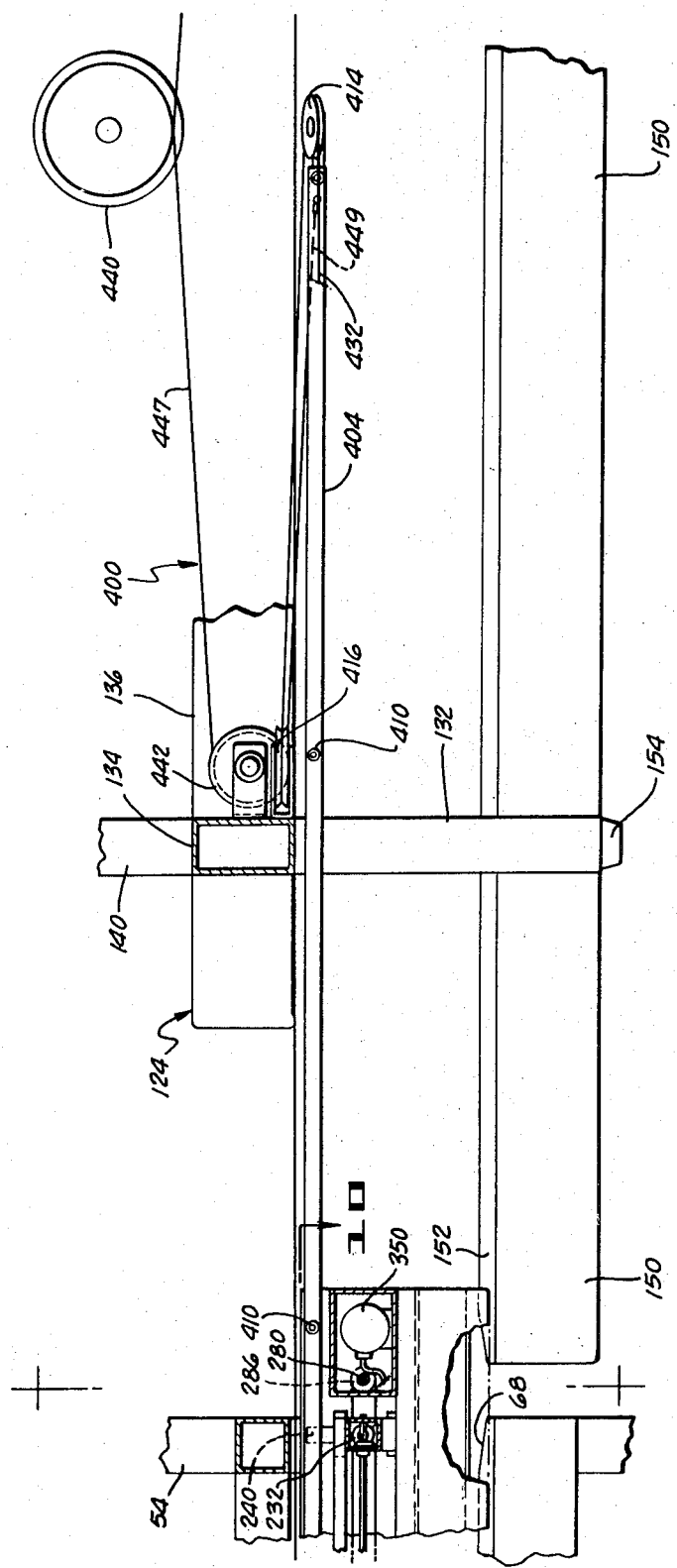

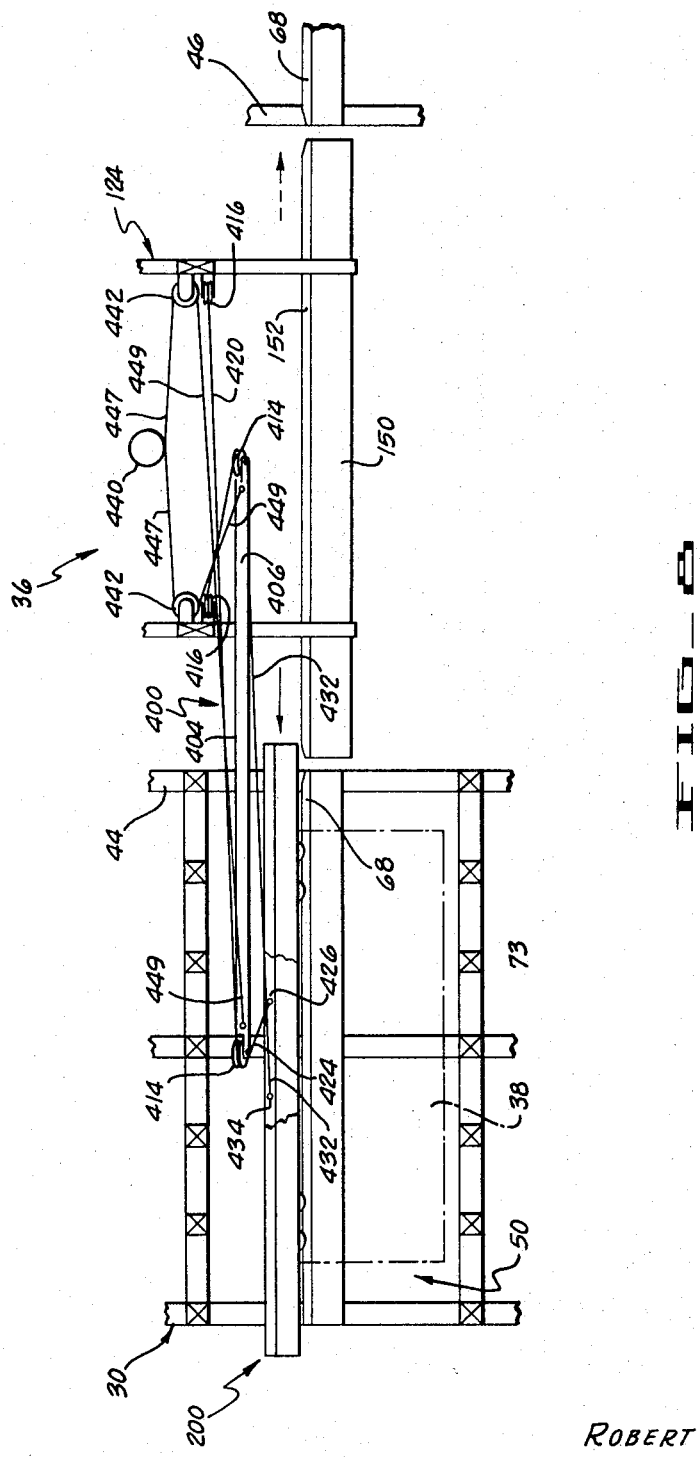

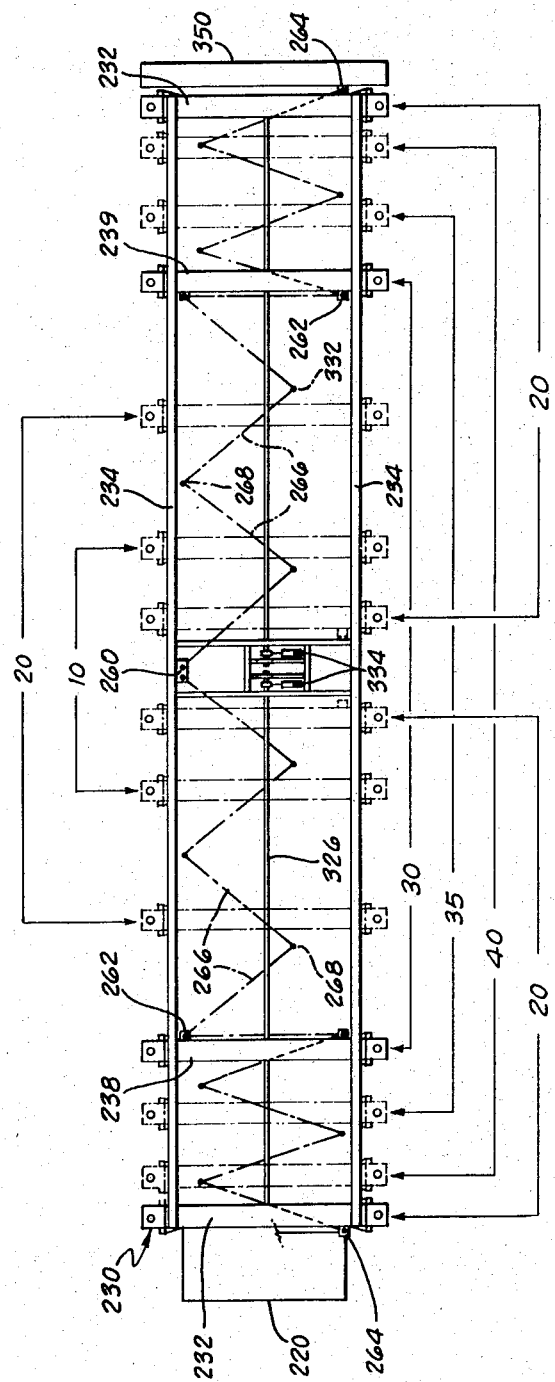

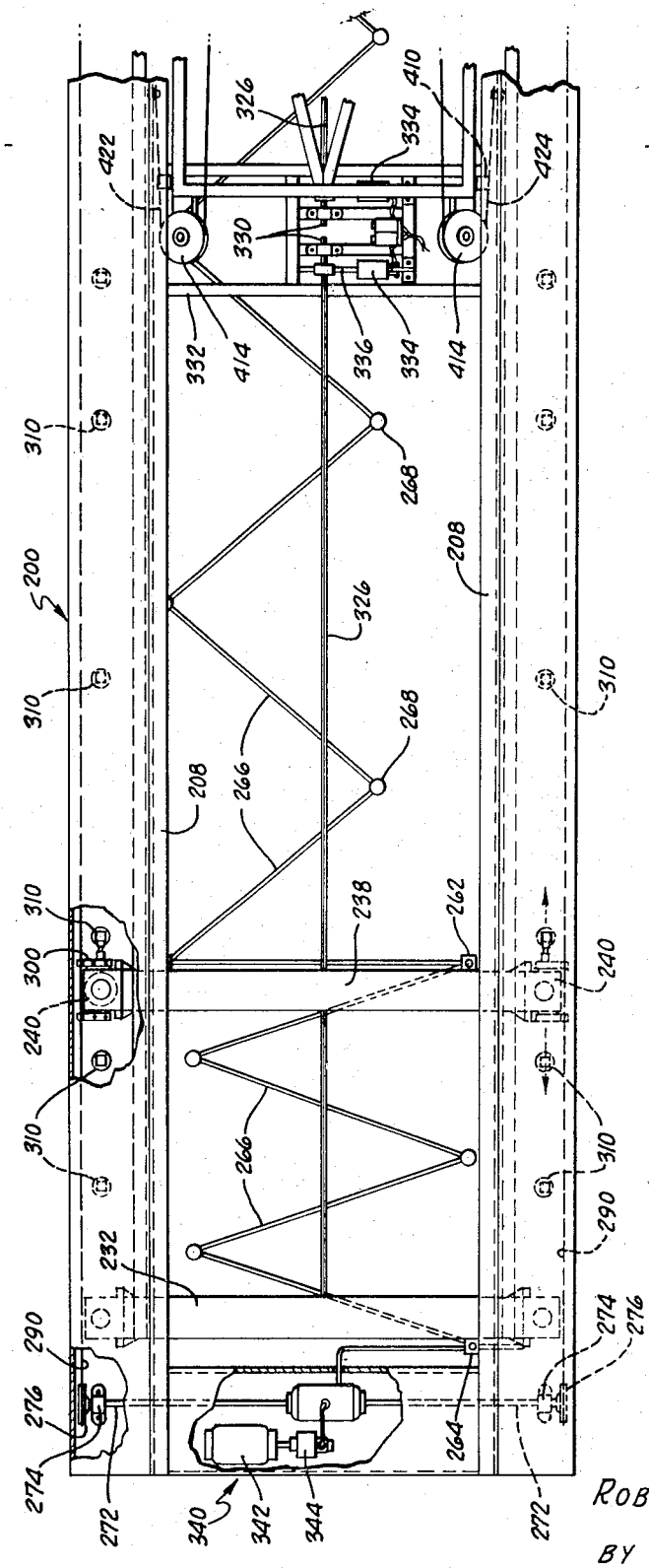

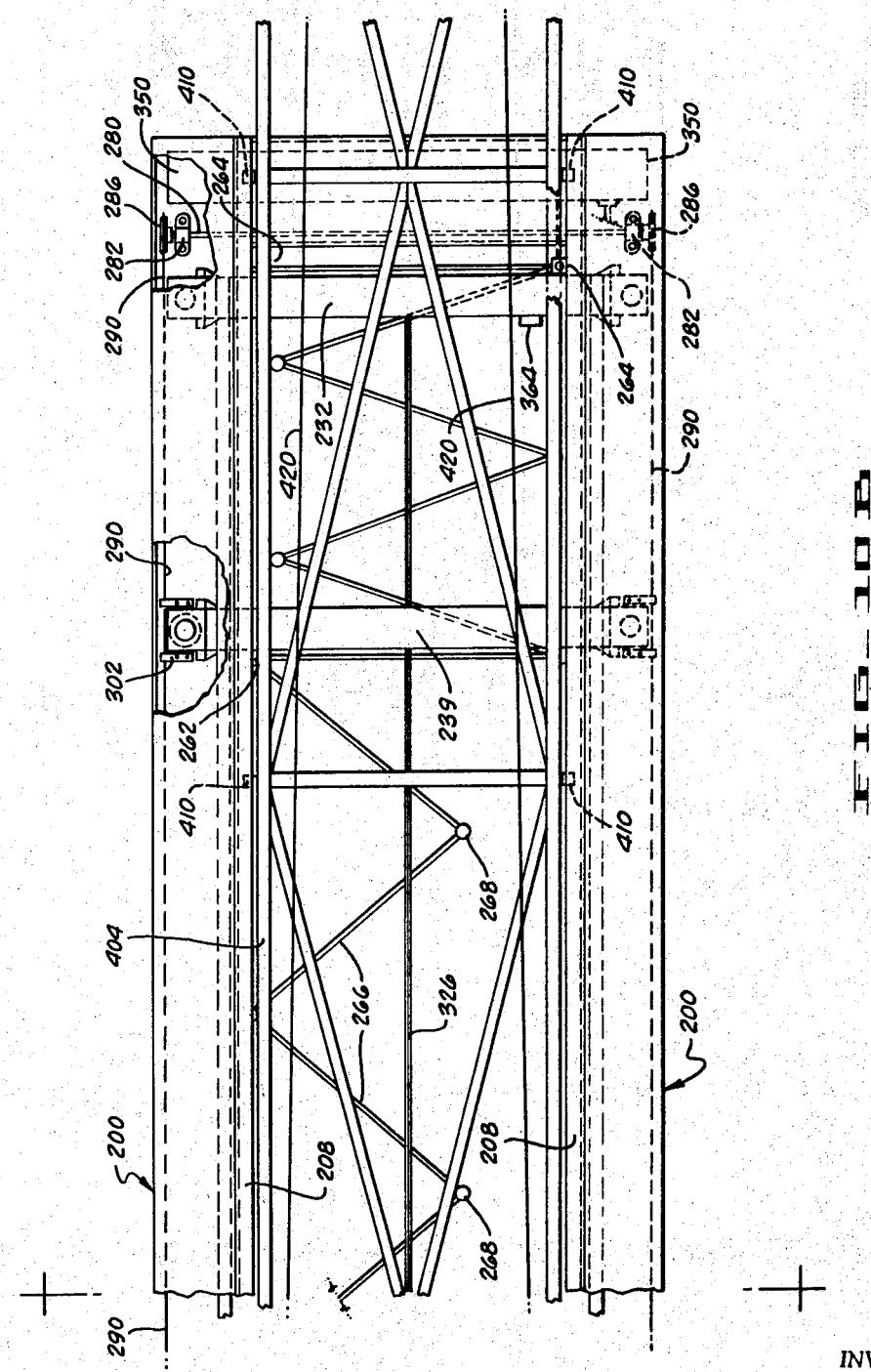

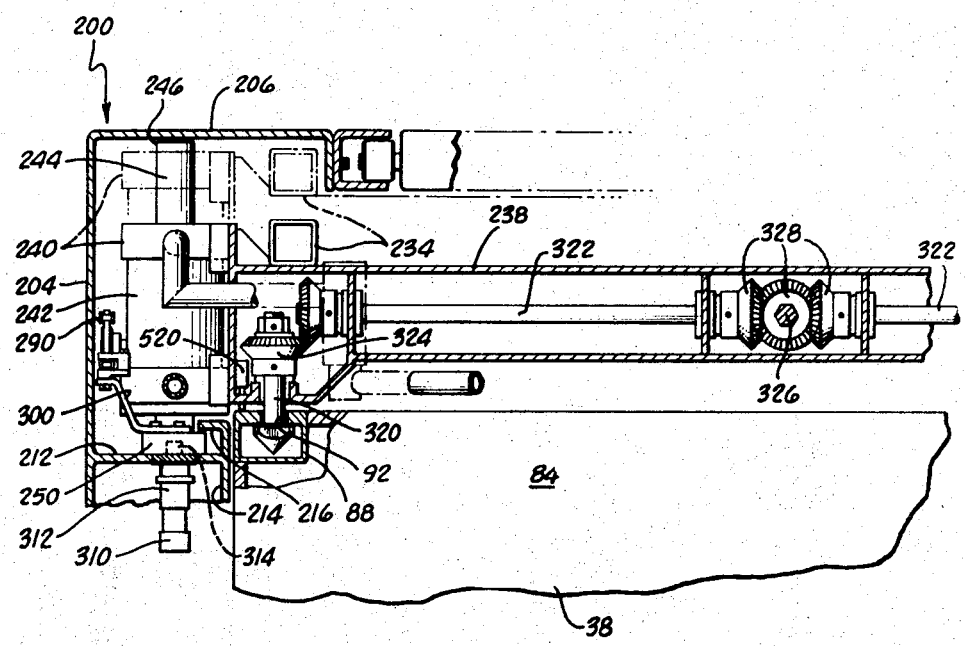
FIG_11
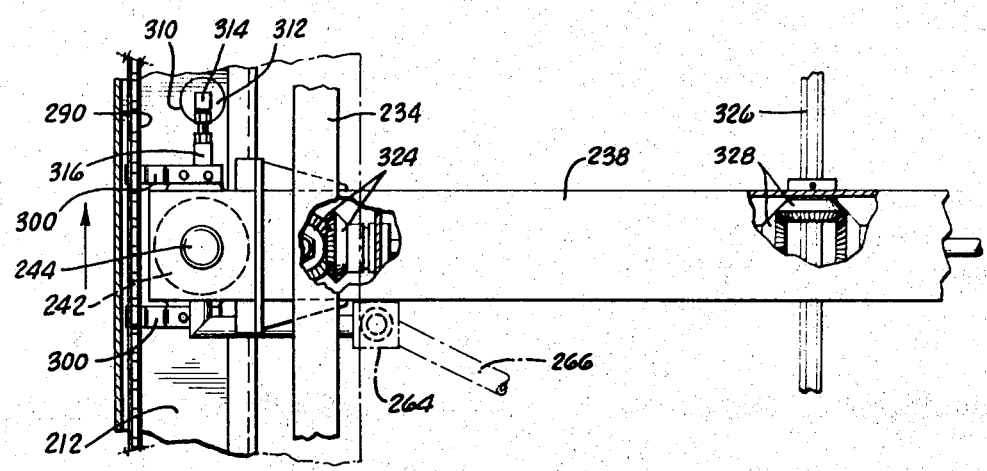
FIG_12
INVENTOR
ROBERT R. YOUNG
BY Leo J. Costello
ATTORNEY

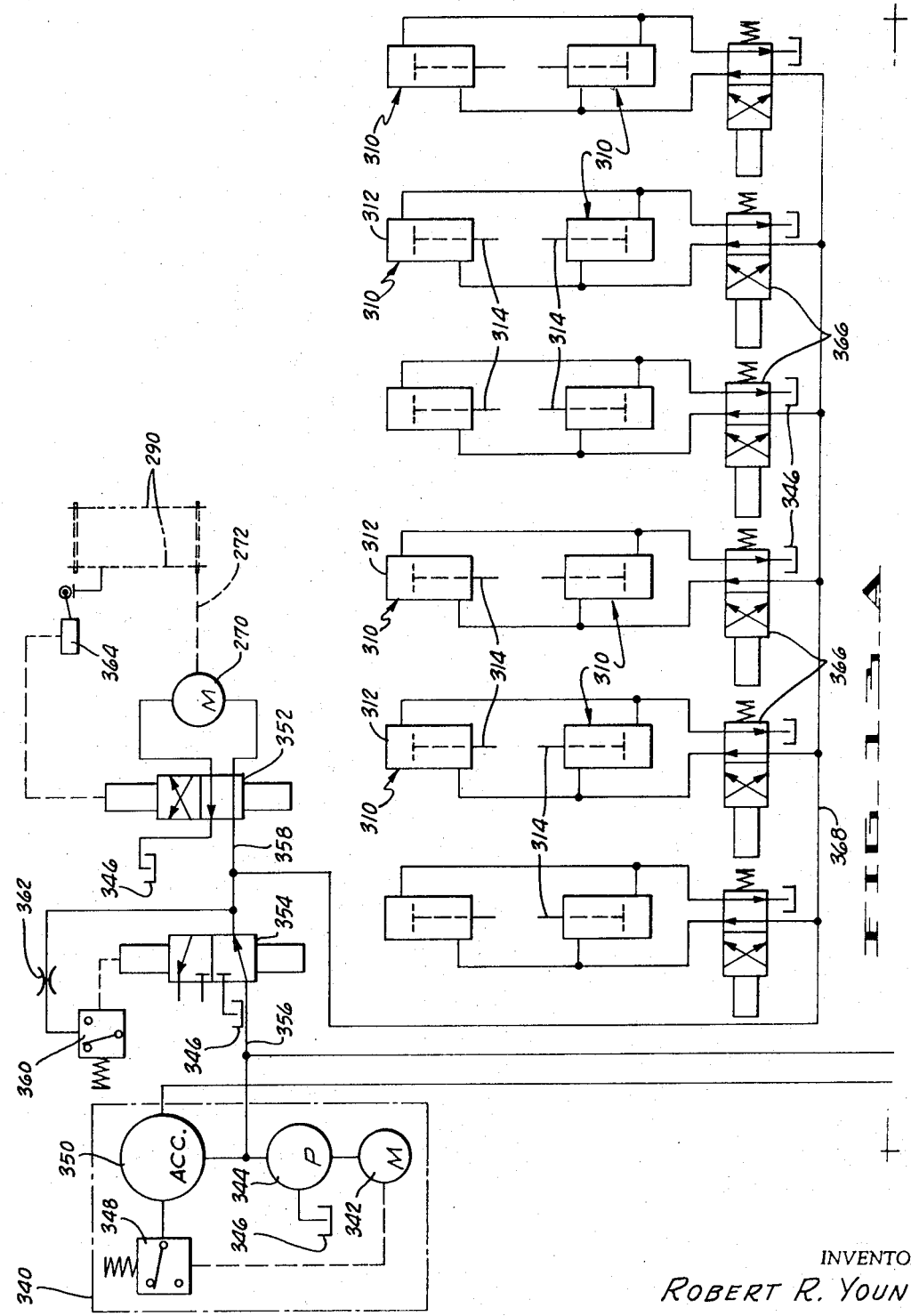

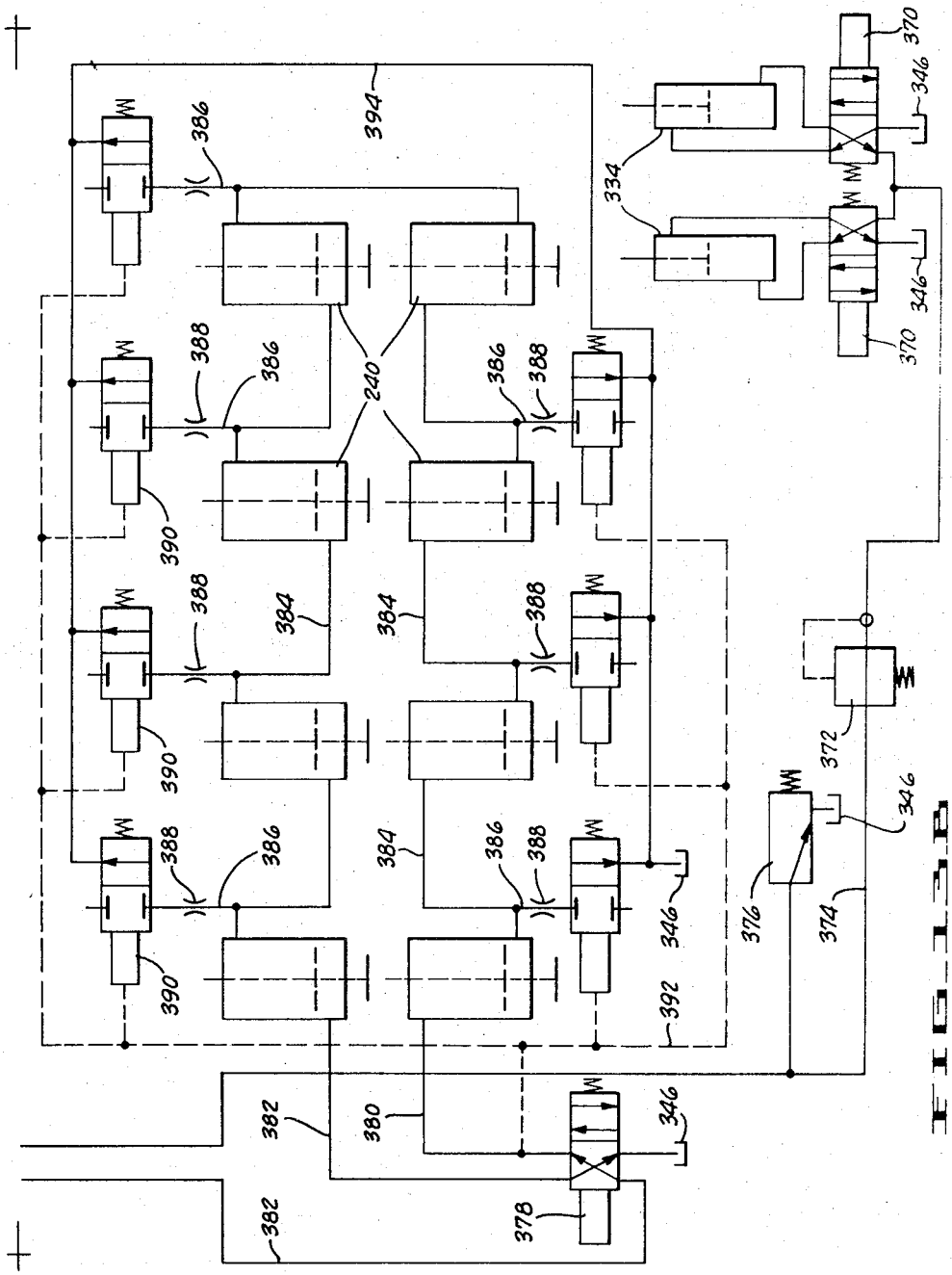

INVENTOR
ROBERT R. YOUNG
BY Leo J. Costello
ATTORNEY

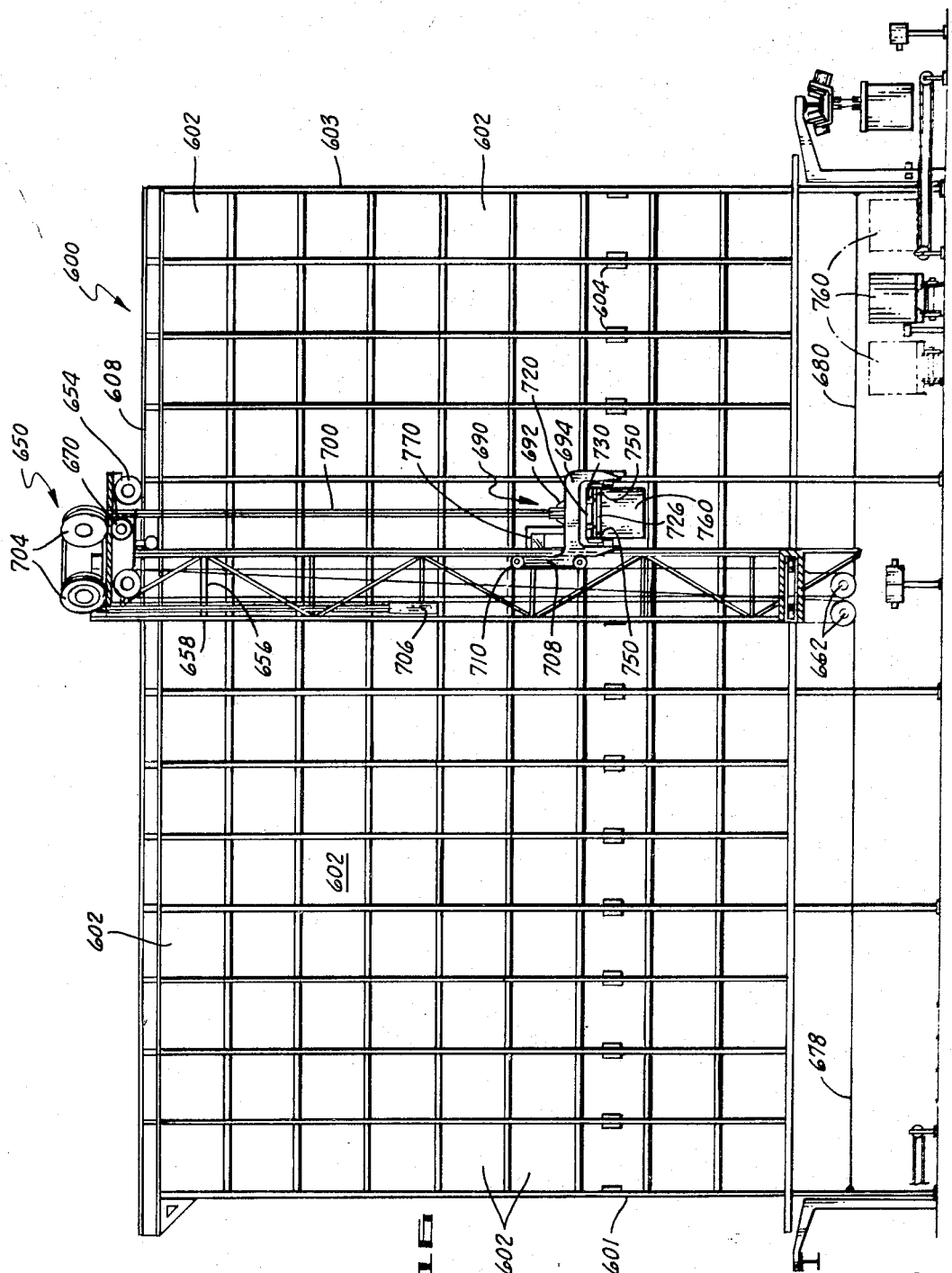

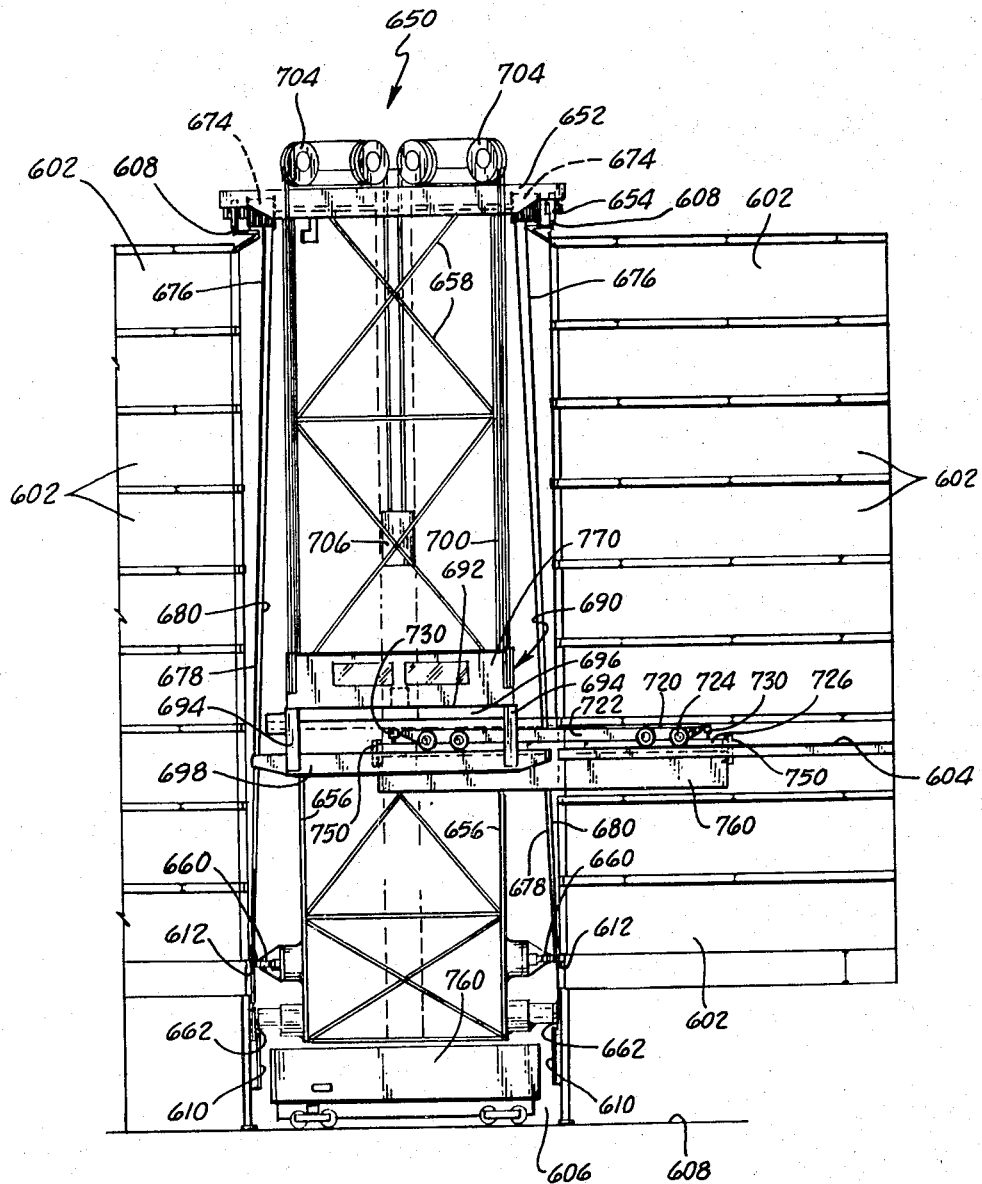

CRANE FOR HANDLING CONTAINERS

This application is a continuation-in-part of my prior copending application Ser. No. 717,174 filed Mar. 29, 1968, now U.S. Pat. No. 3,543,952, and entitled Container Handling System.

BACKGROUND OF THE INVENTION

The present invention pertains to apparatus for handling loads and more particularly to a crane for lifting and moving containers and especially for inserting containers of large size and weight, such as cargo containers, into compartments of a vertical storage facility and for removing the containers from the compartments.

The subject equipment is especially designed to handle large-sized cargo containers in a rapid, efficient and mechanized manner. Although the use of these containers is growing rapidly because of their uniform generally rectangular shape, their large size and weight do present handling problems. According to current standards, these containers may be 10, 20, 30, 35, or 40 feet in length and when loaded, may range from 20,000 pounds to nearly 70,000 pounds in weight.

Well-known shipyard and shipboard cranes and carriers are, of course, capable of lifting and moving such containers, but they are not adapted to insert such containers in or to remove such containers from a vertical array of compartments. Moreover, the known equipment for storing boxes individually or on pallets in warehouses or parking automobiles in garages are not capable of performing these inserting and removing functions in the most desired manner insofar as cargo container handling is concerned.

It is to be noted at this point that the apparatus embodying the present invention is capable of handling loads other than containers but having a shape and other characteristics similar to those of a container. The present description is facilitated, however, by primary reference to cargo containers for which the present invention was designed and is particularly suited.

The present invention overcomes the problems of the prior art by providing a crane which is movable over the vertical face of a storage housing facility provided with generally horizontal compartments and which can pick up a container outside of a compartment, move the container into alignment with an empty compartment, insert the container into a compartment, lower the container into a supported position within the compartment, separate from the container, and raise and withdraw from the compartment; enter a filled or partially filled compartment, lower and attach to a container therein, lift and remove the container from the compartment, and lower and release the container outside the compartment; and move a container among the various compartments and a separate transfer station. The crane is especially designed for accomplishing these functions on well-known cargo containers of varying sizes and heavy weights and of operating in an automatic or semiautomatic manner.

DESCRIPTION OF THE DRAWINGS

FIG. 1 is a fragmentary vertical section of a storage housing and shows a stacker-unstacker crane embodying the principles of the present invention in a passageway of the housing. FIG. 1 also shows a railroad track extending through the housing, railroad cars on the track and illustrates the transfer station where the crane transfers containers to and from the railroad cars.

FIG. 2 is a vertical section taken on a plane indicated by line 2—2 in FIG. 1 but with an operator's cab added to the crane and with only parts of the housing shown in full lines.

FIG. 3 is a fragmentary plan of the storage housing and crane as seen from a position indicated by line 3—3 in FIG. 1.

FIG. 4 is an enlarged diagrammatic elevational view of a portion of the mechanism for raising and lowering the cage of the crane.

FIG. 5 is an enlarged fragmentary side elevation, with parts broken away, as seen from a position indicated by line 5—5 in FIG. 1 showing in particular the cage, carriage, lifting mechanism and transfer mechanism all forming a part of the subject crane.

FIG. 6 is an enlarged fragmentary horizontal section, with parts broken away, taken along line 6—6 in FIG. 1 and showing both the transfer mechanism and the carriage when symmetrically retracted within the cage.

FIGS. 7A, 7B and 7C (jointly referred to as FIG. 7) when placed end-to-end form a composite fragmentary vertical section of the crane and housing taken generally along line 7—7 in FIG. 5 with parts broken away, and particularly showing the carriage and transfer mechanism in fully extended position within one of the compartments of the housing, but with the conduit system of the lift mechanism omitted for clarity.

FIG. 8 is a diagrammatic view, on a reduced scale from FIG. 7, showing the carriage and transfer mechanism in extended position within one of the compartments similarly to FIG. 7 but drawn slightly out of scale in the vertical dimension to facilitate showing the cables between the cage and the transfer mechanism and between the transfer mechanism and the carriage.

FIG. 9 is a plan view, as seen from a position generally indicated by line 9—9 in FIG. 5, of the lift mechanism with the conduits and various positions of lift beams being shown in phantom, and with various container sizes corresponding to said positions being indicated alongside of the mechanism.

FIGS. 10A and 10B (jointly referred to as FIG. 10) when placed end-to-end constitute a composite horizontal section taken generally along line 10—10 in FIGS. 7A and 7B but with more detail of the lift mechanism shown and with parts broken away.

FIG. 11 is an enlarged fragmentary transverse vertical section taken on a plane indicated by line 11—11 in FIG. 7A.

FIG. 12 is a plan view of the structure shown in FIG. 11.

FIGS. 13A and 13B (jointly referred to as FIG. 13) constitute a schematic view of an hydraulic system incorporated in the crane of the present invention.

FIG. 16 is a view similar to FIG. 2 although showing more of the storage housing and associated structure but particularly showing another form of stacker-unstacker crane.

FIG. 17 is a vertical section of the storage housing shown in FIG. 16 but showing arrays of compartments on both sides of the passageway in which the crane is located and also showing the carriage of the crane partially within its cage and partially within a compartment.

DETAILED DESCRIPTION

Figure 14:
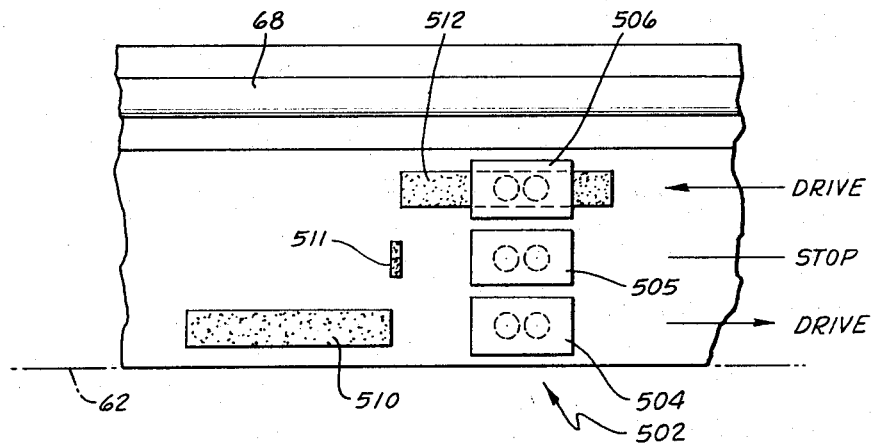
FIG. 14 is a plan of a portion of a compartment showing a portion of a carriage control system.

With reference to FIGS. 1 and 2, there is shown a storage housing 30 (FIGS. 1 and 2), a railroad track 32 running through the housing, railroad cars 34 on the track, and a stacker-unstacker crane 36 mounted in the housing for transferring container, as 38, between the storage housing and the railroad cars. Although the subject crane is described in its preferred embodiment in connection with picking up containers from and placing containers on the railroad cars, it will be understood that the crane is equally suited for transferring containers and other loads of generally rectangular shape to and from other vehicles or to and from the ground or other decking surface. Moreover, the crane may be employed merely for transferring containers within the storage housing and without reference to picking up or depositing containers on a vehicle or deck. Furthermore, although the storage housing 30 is shown erected on land, it could just as well be situated on another vehicle such as a ship, plane or train. The most significant features of the present invention reside in the crane, per se, and in the relationship between the crane and the housing.

Before describing the crane in detail, however, the preferred environment for the crane is briefly described. The housing 30 includes a plurality (two shown in the drawings) of vertical arrays or sections 44 and 46 of horizontally extending compartments 50 which are separated by a vertical aisle or passageway 52. The storage housing includes a plurality of vertical columns 54 extending upward from a deck 56 and horizontal stringers 58 interconnecting the columns. Each compartment is defined by a floor 60, sides 62 and a top 64 and has a pair of transversely spaced substantially horizontal side rails 68 supported on the sides of the compartment midway between the top and the floor of their respective, compartment. It is to be noted that the floors of the lowermost compartments are spaced above the deck by a distance sufficient to permit passage of the railroad cars 34 and containers 38 through the housing. In the described embodiment, each compartment is large enough to hold two 20-foot-long containers in end-to-end relation or one containers up to 40 feet long, it being understood that various size relationships besides those described could be provided.

The railroad tracks 32 are fastened to the deck 56 and pass through the aisle 52 transversely thereof. Each railroad car 34 includes wheels 76 riding on tracks and a flat bed 78 including upwardly extending side guides 80 having inner bevelled surfaces, as is shown in FIG. 2. The railway cars are moved in and out of the housing 30 and, while in the housing, are stopped at a transfer station 82 FIG. 1) substantially centered in the aisle.

The crane 36 of this invention is especially useful for handling large van-type freight containers, as 38, although other loads can be adapted for handling by the subject crane as will be described hereinafter. The container 38 is of generally rectangular shape and has opposite ends 84, opposite sides 86 and relatively square upper and lower corners 88 and 90, respectively. The four upper corners of the container are provided with upwardly opening keyhole-shaped sockets 92 (FIGS. 1, 2, and 11). It is also to be noted that the containers are made in various lengths usually ranging from 10 feet to 40 feet and thus the distance between the pairs of sockets at opposite ends of the container will vary. However, the transverse dimension of different size containers is normally the same.

Referring now more particularly to the stacker crane 36 per se, the crane includes a bridge 100 straddling the aisle 52 (FIGS. 1, 2 and 3). The bridge is provided with trucks 102 that ride on mounting rails 104 secured to the sections 44 and 46 of the storage housing 30. A drive unit 106 (FIG. 2) is supported on one of the trucks for imparting movement in opposite directions to the bridge along the rails 104. A mast 108 of open framework is secured to the bridge, projects downward through the aisle and has a lower end 110 terminating at approximately the same level as the floors 69 of the lowermost compartments 50. It is to be noted that this mast includes a pair of vertical guide rails 114 of generally square cross section (FIG. 6). These guide rails have upper portions 116 (FIGS. 1, 2 and 5) of uniform size and lower end portions 118 somewhat reduced from the size of the upper portions. These lower reduced-end portions extend over a distance from about the bottom to the top of the lowermost compartments 50.

The crane 36 also includes a cage 124 (FIGS. 1, 2, 5 and 6) which is supported for elevational movement from the bridge 100 by lift cables 126 and which is guided for elevational travel by the guide rails 114. The cage includes a pair of C-shaped end members 128, each including vertical inner and outer legs 130 and 132 joined by a top beam 134. The end members are interconnected by upper and lower side beams 136 and 138 attached to the inner and outer legs. The inner legs of the cage have upper extensions 140 and arms 142 project rearward therefrom alongside of the vertical guide rails 114 of the mast 108. Roller assemblies 144 are mounted on these arms and are adapted to engage three sides of the large upper portions 116 of these guide rails when the cage is in proper elevational position. On the other hand, when the cage is positioned relatively low in the aisle, so that the roller assemblies 144 are adjacent to the smaller lower end portions 118 of the guide rails, limited movement of the cage both longitudinally and transversely thereof is permitted with respect to the guide rails. The purpose of the described relationship between the roller assemblies and the guide rails is substantially to prevent horizontal movement of the cage along the upper portions of the guide rails but to allow limited horizontal movement of the cage during transfer of containers 38 between the crane and a railroad car 34.

The inner and outer legs 130 and 132 (FIG. 5) of the cage 124 have foot portions 150 projecting toward each other from their respective legs. Substantially horizontal rails 152 are mounted on the foot portions in spaced parallel relationship to each other. These rails run transversely of the aisle 52 and are alignable with the rails 68 in the compartments 50. The foot portions are spaced apart by a distance slightly greater than the transverse dimension of the containers 38 or other loads being handled, as best illustrated in FIG. 5. Downwardly projecting V-shaped cams 154 are secured to the foot portions for guiding the cage 124 downwardly over a container.

At opposite ends of the cage 124, posts 160 project upward from the top beams 134 (FIGS. 5 and 6), and vertically disposed sheaves 162 are rotatably mounted on these posts. The lift cables 126 are individually trained around the sheaves and extend upward through the bridge 100 and around hoist drums 166 (FIGS. 2, 3 and 4) on the bridge. Since suitable hoisting mechanisms are well known in the art and do not constitute part of the present invention, only a brief description of one such mechanism will be provided herein. Each cable 126 has an end 168 extending under its sheave 162 and thence up over a sheave 170 on the bridge and down to the post 160 to which it is connected. Each cable also has an end 172 extending from its hoist drum over an upper counterweight sheave 176, which is attached to a counterweight 178 by a bracket 180, thence upward again over the sheave 174, and finally downward to a connection with the bracket 180. A hoist motor 190 is mounted on the bridge and is connected in driving relation to the hoist drums 166 by suitable drive trains 192. A source 194 of AC/DC power for the motor 190, as well as other electrical units on the crane, is also mounted on the bridge, with AC power being supplied to the source 194 by a flex cable lying on the top of the housing parallel to the rails 104.

Upon energization of the hoist motor 190 in opposite directions, the cage 124 (FIGS. 1 and 2) may be raised and lowered along the guide rails 114 between a position aligned with the uppermost tier or horizontal row of compartments 50 and the transfer station 82. By combined energization of the hoist motor 190 and the drive unit 106, the cage can be aligned with any one of the several compartments in the sections 44 and 46. Although not shown, suitable braking and speed control mechanisms are associated with the hoist motor and the drive unit for exerting the desired braking action and speed control on the movement of the cage.

With particular reference to FIGS. 5 and 6, the crane 36 also includes a carriage 200 telescopingly mounted within the cage 124. The carriage is generally rectangular in plan view (FIG. 6) and includes a pair of generally C-shaped end beams 202 (FIG. 5) of box-type construction which are interconnected by side panels 204. Top and bottom panels 206 and 207 project inward from the side panels, and inwardly directed U-shaped guideways 208 are attached to the top panels which, together with the end beams, define the inner perimeter of the carriage. The end beams 202 have upper U-shaped slots 210 which are generally coplanar with the guideways 208. Runways 212 extend inward from the side panels 204 intermediate the top and bottom panels, and an inner panel 214 is attached to the associated runway and bottom panel. Each inner panel has upper and lower lips 216 and 218 for purposes to be described.

The carriage 200 is mounted within the cage 124 by wheels 226 which are journaled between adjacent side and inner panels 204 and 214 and which ride on the rails 152. The inner panels 214 are spaced from each other by a distance slightly greater than the transverse dimension of the containers 38 and, as noted in FIG. 5, are located above the foot portions 150. The lower lips 218 serve to guide the carriage downward over the upper portion of a container preliminary to attachment of the crane to a container.

For enabling attachment of the crane 36 to a container 38, or other load, an adjustable lift mechanism 230 (FIGS. 5, 7 and 9–12) is mounted within the carriage 200. The lift mechanism includes a frame comprising a pair of fixed end lift beams 232 disposed adjacent to the end beams 202 of the carriage and interconnected by side bars 234 extending lengthwise of the carriage inward of the side panels 204 and under the top flanges 206. Longitudinally adjustable intermediate lift beams 238 and 239 extend transversely of the side bars and are adapted for movement toward and away from each other and toward and away from their relatively adjacent end beams 232. Each of the beams 232, 238 and 239 is mounted in the carriage by piston-cylinder units 240 connected to opposite ends of the beam.

Each such unit 240 (FIG. 11) includes a vertical cylinder 242, provided with upper and lower ports, secured to an end of its beam and a piston rod 244 extending through the cylinder. The piston rod has an upper end 246 projecting above the cylinder and a lower end projecting below the cylinder and on which is formed a block 250. The upper ends 246 of the piston rods engage the top panels 206 of the carriage 200, and the blocks rest on the runways 212 of the carriage under the lips 216. The end beams 232 are secured to the side bars 234, but the intermediate beams are not so secured and are thus free to move lengthwise of the carriage under the side bars 234 with their blocks 250 sliding along the runways. The end and intermediate beams are simultaneously elevationally adjustable, either all moving simultaneously upward relative to the carriage, or vice versa, upon pressurizing of the piston-cylinder units 240 in opposite directions as described hereinafter.

Referring to FIGS. 9 and 10, a central swivel-type fluid coupling 260 is mounted on one of the side bars 234 of the lift mechanism 230. Intermediate swivel-type fluid couplings 262 are mounted at opposite ends of the intermediate lift beams 238 and 239, and end couplings 264 are secured at the ends of the lift beams 232. The fluid couplings are connected in fluid communication by an articulated or accordianlike series of conduits 266 located in generally the same plane as the bars 234 and connected in end-to-end relation by swivel joints 268. Those conduits which are connected to the couplings are also connected thereto for swiveling movement. The articulated conduits are connected to the piston-cylinder units 240 so that the cylinders 242 of these units are connected in hydraulic series circuit as shown in FIG. 13. The articulated conduits thus allow the intermediate lift beams to move lengthwise of the carriage 200 while maintaining the described fluid connection to the various piston-cylinder units. In this manner, the lift mechanism can be raised and lowered, relative to the carriage 200, irrespective of the longitudinally adjusted positions of the intermediate lift beams.

With reference to FIGS. 7, 9 and 10, the adjustment of the intermediate beams 238 and 239 for connection to containers 38 of various sizes will be described. A size-adjust motor 270, preferably a fluid motor, is mounted in the end beam 202 at one end of the carriage 200, and drive shafts 272 are coupled to this motor and extend toward the outer ends of the beam. The outer ends of the drive shafts are journaled in bearings 274, and drive sprockets 276 are secured to the ends of the shafts. An idler shaft 280 (FIG. 7C) is journaled in bearings in the end beam 202 at the opposite end of the carriage, and idler sprockets 286 are secured to the ends of the idler shaft and are coplanar with corresponding drive sprockets 276. Chains 290 extend about corresponding drive and idler sprockets so as to provide upper and lower runs alongside of the piston-cylinder units 240 of the lift mechanism 230. The blocks 250 at opposite ends of the intermediate beams 238 are connected to the lower runs of the chains 290 by lower brackets 300, and the blocks at the opposite ends of the intermediate beam 239 are connected to the upper runs of the chains by upper brackets 302. The intermediate beams are connected to the chains so that they are always spaced the same distance from their adjacent end beam 232.

Upon operation of the adjust motor 270 (FIG. 10A), the upper and lower runs of the chains 290 can be moved in opposite directions lengthwise of the carriage 200. When the upper runs are moved to the left in FIG. 10, the intermediate lift beams 238 and 239 are moved toward each other. This occurs because the lift beam 239 is directly connected to the upper runs and thus moves therewith and because the lift beam 238 is connected to the lower run which, of course, moves in the opposite direction from the upper run. Upon movement of the upper runs to the right, as viewed in FIG. 10, the intermediate lift beams move away from each other.

In order to locate the intermediate lift beams 238 and 239 in desired positions corresponding to the size of particular containers 38, pairs of fluid-operated stop units 310 are provided on one-half of the carriage 200 (the left half in FIGS. 7 and 10) for coaction with the intermediate beams. Each stop unit (FIGS. 7A, 11 and 12) has a housing 312 mounted under a runway 212 of the carriage 200 and a plunger 314 movable from a retracted position within the housing upward through the runway to an extended position in the path of travel of one of the blocks 250 of the intermediate lift beam 238. Both blocks of this lift beams have resilient bumpers 316 (FIG. 12) projecting therefrom lengthwise of the carriage and toward the center thereof. With all of the plungers retracted below the surfaces of the runways, the intermediate lift beams are free to move lengthwise of the carriage as above described. By actuation of selected transversely related pairs of stop units, their associated plungers are moved into extended positions above the runways so as to be engaged by the bumpers and limit further inward travel of the beam 238. This of course prevents further movement of the upper runs 294 toward the right in FIG. 10 so that both intermediate lift beams 238 and 239 are spaced the same distance from their adjacent end beams 232 and are in predetermined spaced relation to each other, corresponding to a particular size of container. It will thus be understood how the intermediate lift beams can be precisely placed in differing spaced relationships. Examples of these various relationships are shown in FIG. 9 as based upon currently popular container sizes, although it will be understood that other positions of adjustment are possible. The preferred apparatus and procedure for placing the intermediate beams in selected positions will be described hereinafter.

The lift mechanism 230 is connected to a container or containers 38 by male twist-lock elements 320 (FIG. 11) journaled in opposite ends of the lift beams 232, 238 and 239 and projecting downward therefrom. Transverse drive shafts 322 are journaled in opposite end portions of each lift beam and are drivingly connected to their associated locking elements by bevel gears 324. Longitudinal drive shafts 326 (FIG. 9) of hexagon cross section are disposed on the centerline of the lift mechanism, are journaled in the lift beams 232, 238 and 239, and are drivingly connected to the inner ends of the shafts 322 by bevel gears 328. The connection of each shaft 326 to the gears thereon in the intermediate beams 238, 239 is slidable to allow for adjustment of these beams. The drive shafts 326 have adjacent inner ends 330 journaled on a mounting framework 332 which interconnects the side bars 234 of the lift mechanism. For rocking the drive shafts in opposite directions, twist control cylinders 334 are mounted on the framework and are connected to the inner ends 330 of the longitudinal drive shafts by linkages 336. By actuating the cylinders 334 in opposite directions in a manner to be described, all of the lock elements can be rotated in opposite directions through an angle of approximately 90° prior to entry into or exit from the sockets 92 of the containers and for locking association with the containers.

In order to deliver fluid power to the piston-cylinder units 240, the size-adjust motor 270, the stop units 310, and the twist control cylinders 334, an hydraulic power system 340 (FIG. 13) is provided. This system includes an electric motor 342 (FIG. 13A), a pump 344, a reservoir 346 (shown symbolically in several places in FIG. 13), and a pressure switch 348 connected in hydraulic circuit as shown and mounted within the end beam 232 next to the size-adjust motor 270 (FIG. 10A). The hydraulic system also includes an accumulator 350 mounted within the end beam 232 at the opposite end of the carriage 200 (FIG. 10B). With continuing reference to one or more of FIGS. 10 through 13, a motor control valve 352 (four-way, two-position solenoid-operated momentary contact type) is connected to the size-adjust motor 270 for controlling the flow of fluid to this motor. Upon alternate electrical energization of the solenoids associated with this valve, the valve can be reversed to reverse the flow of fluid to the motor and thus reverse the direction of rotation of drive shafts 272 on the motor. This in turn reverses the direction of travel of the upper and lower runs on the chains 290, as can be seen from the diagrammatic showing in FIG. 13A. An enabling valve 354 (three-way, two-position solenoid-operated, momentary contact) is connected to the pump by pipe 356 and to the motor control valve by pipe 358. Both of these valves are also connected to the reservoir 346. A time delay pressure switch 360 is electrically connected to one of the solenoids of the enabling valve and hydraulically connected through a needle valve 362 to the pipe 358. Furthermore, a limit switch 364 is mounted on one of the end beams 232 for engagement by the adjacent intermediate lift beam 238 when the latter is in its extreme outer position. This limit switch is electrically connected to one of the solenoids in the motor control valve. Stop control valves 366 (four-way, two-position, solenoid-operated, spring return valves) are individually connected to associated pairs of stop units 310, each such pair being hydraulically connected in parallel as shown in FIG. 13, and all being connected by pipe 368 to the pipe 358 joining the motor control and enabling valves. Each of the stop control valves is also connected to the reservoir 346. When deenergized, the stop control valves are spring-urged into positions connecting their respective pairs of stop units to the pipe 368 so that the plungers 314 of the stop units are fully retracted. That is, deenergization of the stop control valves automatically causes retraction of the stop units.

The hydraulic system 340 described so far is employed to adjust the lift mechanism 230 in the following manner. The electrical motor 342 is energized to cause the pump 344 to deliver pressure on its output side. The enabling valve 354 is electrically energized to provide fluid pressure to the motor control valve 352 which is also electrically energized at this time to cause rotation of the drive shafts 272 of the size-adjust motor 270 in the desired direction so that the intermediate lift beams 238 and 239 will move toward their extreme outer positions. The limit switch 264 is thereby actuated which causes the motor control valve to shift, thus reversing the motor 270. While the intermediate beams are in their extreme outer positions, the pair of stop units 310 at the desired longitudinal position along the carriage 200 are extended by electrically energizing their associated control valves 366. More specifically, with the selected control valve 366 energized, fluid pressure is delivered from the pump 344 through the enabling valve 354 and through the pipes 358 and 368 to the energized valve 366 which thus delivers fluid to the associated pair of stop units causing their respective plungers to extend upward through the runways 212.

Immediately upon reversal of the motor 270, the intermediate lift beams 238, 239 move back toward the center but stop upon contact of the bumpers 316 with the now-extended plungers 314. As a result of this collision, the size-adjust motor 270 stalls causing pressure to build up in the pipe 358. The needle valve 362 slowly permits fluid to flow to the pressure switch 360 which, upon reaching a predetermined high pressure (e.g. 2,500 p.s.i.), electrically actuates the enabling valve 354 causing it to shift so as to block fluid pressure from the pump 344 to the motor control valve 352. With loss of pressure in pipe 358, the previously energized stop control valve 366 deenergizes causing the extended plungers to react. The intermediate beams are, however, locked in the adjusted position by the rotor of the size adjust motor 270 which is of course connected to these beams as described above.

The hydraulic system 340 is also used to control the twist lock elements 320. Thus, with reference again to FIG. 13B, twist lock valves 370 (four-way, two-position, solenoid-operated) are individually connected to the twist control cylinders 334 and are both connected through a pressure regulating valve 372 to the pump 344 by a pipe 374. A pressure relief valve 376 is also connected to pipe 374. Both of the twist control valves and the pressure release valve are connected to the reservoir 346. It will be understood that, by electrically energizing the twist control valves alternatively into their two positions, hydraulic fluid will be delivered from the pump to the twist control cylinders, causing the same to rotate the twist lock elements in one direction or the other, as explained above.

The hydraulic system 340 controls the raising and lowering of the lift mechanism 230 through a main lift control valve 378 (four-way, two position, solenoid-operated valve) which has connections to the accumulator 350, the reservoir 346 and, by main lines 380 and 382, to the lower port of one of the piston-cylinder units 240 and to the upper port of another one of the piston-cylinder units. These piston-cylinder units are filled with hydraulic fluid and are joined in hydraulic series circuit by connecting lines 384, one end of each line being connected to the lower port of a cylinder 242 and the opposite end thereof being connected to an upper port of the next adjacent cylinder. This series circuit can be seen in FIG. 13B by tracing from the main control valve via line 380 to the lower left cylinder 240 and thence through all of the cylinders back to the main control valve by way of line 382. Bleed lines 386 connect from each line 384 through needle valves 388 to pilot valves 390. A fluid conducting pilot line 392 connects all of the pilot valves to the main line 380, and each pilot valve is connected to a return line 394 which flows into the reservoir 346.

As shown in FIG. 13B, all of the piston-cylinder units 240 are in their raised positions, that is, in positions causing the lift mechanism 230 to be in its upper position within the carriage 200, as illustrated in FIG. 5, it being remembered that the piston rods 244 are stationary while the cylinders 242 move relative to the carriage. This condition exists because pressure from the accumulator 350 is conducted through the main control valve 378 (in its "raise" position) to the upper ports of all of the cylinders 242 causing these cylinders to rise relative to their respective piston rods 244 so that, as best shown in dashed lines in FIG. 11, the lift mechanism will be elevated within the carriage. In order to lower the lift mechanism relative to the carriage, the main lift control valve 378 is reversed and placed in its "lower" position, by electrical energization of its solenoid, so that pressure from the accumulator is delivered to the lower ports of the piston-cylinder units. The weight of the lift mechanism naturally causes the same to drop relative to the carriage and to cushion this drop, fluid from the upper portions of the cylinders 242 is required to bleed slowly through the needle valves 388 via lines 384 and 386 and the pilot valves 390 back to the reservoir 346 through the return line 394. It is to be understood that the pilot valves are hydraulically adjusted between a position establishing fluid communication between the bleed lines 386 and the reservoir 346 when the main lift control valve 378 is in the "lower" position, and a position blocking fluid communication between the bleed lines and the reservoir when the main lift control valve is in the "raise" position.

When the rails 152 of the cage 124 are individually aligned with the rails 68 in one of the compartments 50 (FIG. 7), the carriage 200 can be moved into and out of the compartment by a transfer mechanism generally indicated by the number 400 (FIGS. 5–8) and described at this point. This mechanism includes a generally rectangular frame 404 having sides 406 interconnected by ends 408. The frame is mounted for movement lengthwise of the carriage by rollers 410 projecting from the sides of the frame and and riding in the guideways 208 and in so doing, moves through the slots 210. Outwardly canted corner pulleys 414 are mounted at the corners and endwardly of the transfer frame, and fixed horizontal pulleys 416 are rotatably mounted on the posts 160 of the cage 124 adjacent to the sheaves 162. A first carriage drive cable 420 (FIG. 6) extends around one of the fixed horizontal pulleys 416 and has ends 422 and 424 extending around the corner pulleys at one end of the transfer frame. From the corner pulleys, these ends 422 and 424 extend lengthwise within the guideways 208 and are connected thereto at points 426. A second carriage drive cable 428 is trained around the other fixed horizontal pulley 416 and has ends 430 and 432 extending around the corner pulleys 414 at the opposite end of the frame, these ends 430 and 432 also extending in the guideways and being attached at points 434 adjacent to the points 426.

The transfer mechanism 400 also includes a transfer drum 440 rotatably mounted on the crossmembers 148 of the cage between the posts 160 so that the axis of the drum is horizontal and disposed transversely of the carriage and transfer frame 404. A pair of vertical sheaves 442 is rotatably mounted on each post 160 with their axes parallel to the drum and with their planes intersecting the drum. Main drive cables 446, 447 are wound around opposite ends of the drum, feed off the lower edge thereof and extend around the vertical sheaves at opposite ends of the cage. The drive cables have ends 448, 449 which are connected to the sides 406 of the transfer frame 404 adjacent to the corners thereof. The transfer drum is rotated in opposite directions by an electric drive motor 450 that is mounted on the crossmembers 148 of the cage and is coupled to the drum through a speed reducer 452. With particular reference to FIG. 8, it will be understood that rotation of the drum in opposite directions will move the transfer frame lengthwise and that such movement of the transfer frame will move the carriage lengthwise of the cage by virtue of the carriage drive cables 420 and 428. The cable-pulley-sheave arrangement described above is capable of causing the carriage to move linearly twice the distance of linear movement of the transfer frame. Accordingly, the carriage is movable between a retracted position entirely housed within the cage, as illustrated in FIGS. 1 and 6, and extended positions entirely within one of the compartments 50 at either end of the cage, as illustrated in FIGS. 7 and 8. During such transfer movement, the wheels 226 of the carriage ride on the rails 152 and/or 68 so as to provide support for the carriage in all positions thereof.

For supplying electrical power to the carriage, an electric cable 460 has one end, not shown, connected to a source of electrical power as 194, is wound about a reel 462 on the crossmembers 148 of the cage 124 and has connections to the various electrical units as required. Cable rollers 464 are also mounted on the top beams 134 of the cage to guide the electric cable as it pays off and on the cable reel during extension and retraction of the carriage.

An operator's cab 480 provided with windows on all sides is mounted on the cage 124 and is also provided with suitable control panel, not shown, for enabling the operator to run the drive unit 106 and the motors 190, 342 and 450 as well as to control the various valves in the hydraulic system. The crane can be semiautomatically controlled by an operator in the cab, or in a central tower, not shown, or entirely automatically by computer.

Figure 15:
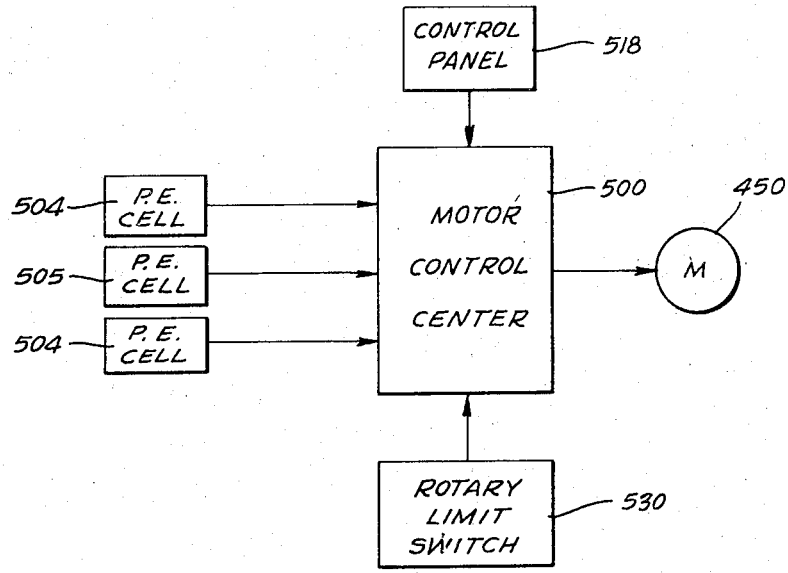
FIG. 15 is an electrical schematic of the carriage control system.

The subject crane 36 is also provided with a control system for the drive unit 106 (to control the horizontal positioning of the cage 124 relative to a compartment 50), for the hoist motor 190 (to control vertical positioning of the cage relative to a compartment), and for the drive motor 450 (to control the positioning of the carriage 200 in a compartment), the latter being shown in FIGS. 14 and 15. The carriage control system includes a motor control center 500 on the cage and electrically connected in controlling relation to the motor 450. This center includes starter and running switches and relays, not shown but which, per se are known in the art. A sensing unit 502 (FIG. 5) including forward, stop and reverse photoelectric cells 504, 505 and 506 is mounted on and under the bottom panel 207 of the carriage with the cells being disposed abreast of each other, as shown in FIG. 14. Each of these cells is electrically connected to the motor control center. Forward, stop and reverse control target tapes 510, 511 and 512 (of adhesive, reflective tape) are positioned alongside the rails 68, and to the rail mountings, in each compartment 50. The tapes are individually positioned in the paths of travel of the cells as they move with the carriage into and out of a compartment, but are staggered lengthwise of the rails, as shown in FIG. 14.

In moving the carriage into a compartment, the motor 450 is energized through a control panel 518 and control center 500 whereupon the motor accellerates movement of the carriage into the compartment 50 for half the distance of its travel toward a fully inserted position. A rotary limit switch 530 senses this movement, from a shaft 532 driven by the motor 450, and operates through the motor control center 500 to cause the motor to decellerate movement of the carriage until it is stopped in a nearly fully inserted or coarse position wherein the sensing unit 502 is over the tapes 510, 511 and 512. If the forward cell is over the forward tape 510, this cell is activated by such tape and sends a signal to the motor 450 causing it to move the carriage farther into the compartment; this signal and such movement continues until the forward cell moves rearwardly past the forward tape to deactivate the cell 504, to deenergize the motor 450 and to position the stop cell 505 over the stop control tape. When the stop control cell is actuated, its signal causes actuation of braking mechanism in the motor 450 thereby precisely locating the carriage in the compartment. However, inertia of the carriage may cause overtravel of the stop cell beyond the stop control tape whereupon the reverse cell 506 is over, and is activated by, its tape 512. The motor is again energized but this time moves the carriage in a direction outwardly of the compartment until the reverse cell moves forwardly past the reverse tape. Inertia may again cause overtravel of the stop control cell although to a lesser extent than previously. After hunting forwardly and rearwardly in the described manner, the carriage finally stops with the stop control cell precisely over the stop control tape. The lift mechanism 230 is then operated to pick up or deposit a container 38. When it is desired to remove the carriage from the compartment, the motor is energized through the control panel 518 and control center 500 to override the stop control cell and motor braking mechanism and cause travel of the carriage out of the compartment.

Control systems identical to that shown in FIGS. 14 and 15 are used to control the drive unit 106 and hoist motor 190. That is, sensing units 540 and 550 (like unit 502) are respectively mounted on the bridge 100 and the cage 124 and are activated by target tapes (not shown but like tapes 510–512) on the storage housing 30 in order precisely to position the cage horizontally and vertically relative to a selected compartment, with the rails 68 and 104 in exact alignment. As these units 540 move past the tapes, signal pulses are generated as a means of counting the number of compartments traversed in reaching a selected compartment.

OPERATION

The operation of the stacker-unstacker crane 36 of the present invention is reviewed at this point. Assuming that a container 38 is located on a railroad car 34 at the transfer station 82 (FIG. 1) and that it is desired to place this container in one of the compartments 50 several levels up in the storage housing 30, the crane 36 is moved down to pick up the container. That is, by operation of the drive unit 106 and the hoist motor 190, the cage 124 is moved down and horizontally, as required, to position the cage over the container. Before bringing the cage into contact with the container, the intermediate lift beams 238 and 239 are adjusted, if necessary, by the sizedjusting motor 270 lengthwise of the carriage 200 so that the distance between these intermediate beams corresponds to the length of the container to be picked up.

The cage 124 is then lowered over the container 38 with the cams 154 and the lips 218 guiding the legs 130 and 132 and the inner panels 214 down on opposite sides of the container. The cage and the container are in proper longitudinal relationship to each other by virtue of locating the railroad car 34 in the transfer station which had predetermined relationship to the crane 36 and aisle 52. The cage is lowered so that the locking element 358 enter the sockets 92 in the top of the container. If necessary, the cage can be moved slightly in all directions at this time, because of the relatively loose fit of the roller assemblies 144 on the guide rails 114 thereby to enable insertion of the locking elements in the sockets. When the elements are fully inserted and the bottoms of the lift beams 232, 238 and 239 are resting on the top of the container (as in FIG. 5), an automatically retractable switch 520 is depressed thereby creating a signal in the cab 480, or other control center, that contact with the container is established. The twist-control cylinders 376 are then energized to rotate the lock elements into locked positions in the sockets whereby the lift mechanism 230 is engaged with the container.

It is a significant feature of the invention that the lift mechanism 230 can then be operated to lift the container 38 relative to the cage 124 and the carriage 200. That is, the hydraulic power system 340 is energized to actuate the piston-cylinder units 240 whereby the beams 232, 238 and 239 are simultaneously raised on their rods 244 and held in this raised position.

With the container 38 securely grasped within the carriage 200, the cage is elevated on the guide rails 114 by operating the hoist motor 190. If necessary, the bridge 100 is moved along the rails 104 by the drive unit 106 so as to position the cage opposite the empty compartment 50 in which it is desired to insert the container. More specifically, the rails 152 of the cage are precisely aligned with the rails 68 of the desired compartment. Automatic control systems including sensing units 540 and 550 and retroreflective tapes are used on the housing and cage for precisely aligning the rails 152 with rails 168 of a selected compartment. When so aligned, the cage is stopped and the hoist motor 190 and the drive unit 106 are braked.

The container 38 is inserted into the empty compartment 50 by operating the transfer motor 450 which rotates the drum 440 thereby to apply lengthwise force to the transfer frame 404 in the direction of the compartment 50. Through the carriage drive cables 420 and 428, the carriage 200 is moved along the rails 158 and 68 at twice the speed of linear movement of the transfer frame. The carriage thus enters the compartment and, when it is fully projected from the cage as in FIG. 7, it is entirely within the compartment whereas the transfer frame is in spanning or bridging relationship with the compartment and the cage 124. The carriage is precisely positioned in the compartment by the sensing unit 502 and target tapes 510, 511 and 512, as above described.

With the loaded carriage 200 entirely within the compartment 50, the piston-cylinder units 240 of the lift mechanism 230 are operated to lower the container 38 relative to the carriage until the bottom of the container rests on the floor 60 of the compartment. The twist-control cylinders 334 are operated to rotate the locking elements 320 into their release positions. Thereafter, the lift mechanism is operated to raise the lift beams 232, 238 and 239 to remove the elements 320 from the sockets 92 and thus to release the lift mechanism from the container; the switch 520 signals when removal is complete. The transfer mechanism 400 is again operated, but in an opposite direction to withdraw the empty carriage 200 from the compartment 50 and to retract it back into the cage 124 where it is stopped and retained. The cage is thus ready to be moved vertically and/or horizontally either to another compartment or to the transfer station 82.

It will be understood that the carriage 200 can be inserted into a compartment 50 in which a container 38 is located, lower, attach to and lift the container and remove the same from the compartment or move the container forwardly and rearwardly in the compartment. The same preliminary adjustment of the lift mechanism 230, as described above, to adapt to various sizes of containers in the various compartments can be effected prior to pickup in a compartment just as prior to pickup at the transfer station 82; this adjustment can be made whether the carriage is in or out of the compartment and thus whether the carriage is extended or retracted. In other words, it will be understood that the crane can be operated in a manner reverse from that discussed above in order to remove containers from compartments. Furthermore, it will be understood how a container in the carriage can be lowered by the crane onto an empty railroad car 34, being guided downward thereon by the side guides 80 on the car.

SECOND FORM

With reference to FIGS. 16 and 17, a storage housing 600 similar to the housing 30 is shown. Since the housing 30 has already been described in some detail, only the main features of the housing 600 will be specifically referred to by reference number. Thus the housing 600 has compartments 602, side or support rails 604 (shown only in one level of compartments in FIGS. 16 and 17 but understood to be in all compartments), an aisle 606, upper horizontal mounting rails or tracks 608, lower horizontal guide channels 610 mounted on opposite sides of the aisle, and lower guide plates 612 disposed immediately above the guide channels.

The second form of stacker crane is identified by number 650 and is located in the aisle 606. The crane 650 has a bridge 652 extending transversely of and movable along the aisle on upper vertical wheels 654 which ride on the upper tracks 608. A pair of side frames 656 and a transverse frame 658 are secured to the bridge and project downward therefrom. Horizontal stabilizing wheels 660 are mounted on the lower portions of the side frames and ride along the guideplates 612 so as to resist movement of the bridge transversely within the aisle. Two vertical stabilizing pulleys 662 are mounted on the lower end of each side frame and are individually disposed in the guide channels 610. A bridge drive mechanism 670 is mounted on the bridge and has driving connection to the upper wheels 654. Drums 674 also have driven connection to these wheels, and travel cables 676 are wound around the drums. Each cable has first and second ends 678 and 680 which extend down from the drum. The first end portion 678 of each cable passes under one of the stabilizing pulleys on its side of the crane, extends horizontally and thus parallel to the dock, and is connected to one sidewall 601 of the housing 600. The other end portion 680 of each cable extends under the stabilizing pulley and then in the opposite direction from and colinear with end portion 678 to the other sidewall 603 to which it is attached. As the drive mechanism motivates the bridge lengthwise of the aisle, the pulley-drum-cable combinations on opposite sides of the bridge resist movement of the side and transverse frames out of a vertical plane or, stated otherwise, prevent skewing of the side and transverse frames relative to the horizontal levels and vertical rows of storage compartments.

The stacker crane 650 also includes a hoist 690 which has a grab unit or cage 692 provided with downwardly directed C-brackets 694 rigidly interconnected by beams 696 in transversely spaced relation to each other. Spaced parallel, substantially horizontal side rails 698 are secured to the depending arms of the C-brackets and extend substantially the entire width of the aisle, it being noted that the ends of the rails are in closely spaced relation to the open ends of the compartments 602. These rails are transversely spaced the same distance from each other as, and are intended align with, the rails 604 in the storage compartments. Support cables 700 are individually secured to the top portions of the C-brackets and extend upwardly over sheaves 704 mounted on the bridge 652 which are connected to a drive mechanism, not shown, on the bridge. The opposite ends of the support cables are connected to a counterweight 706 which is guided for vertical travel in a vertical passage provided in the transverse frame 658. Furthermore, guide arms 708 are individually secured to the C-brackets and mount rollers 710 which ride in vertical guideways also provided in the transverse frame.

It is thus evident that the stacker crane 650 is movable vertically and horizontally in the aisle 606 to bring the grab unit 692 of the hoist 690 into alignment with selected compartments 602 on opposite sides of the aisle in the housing 600 and more specifically to bring the side rails 698 into precise alignment with the pairs of side rails 604 in the selected compartments.

The stacker crane 650 also includes a carriage 720 mounted within the C-brackets 694 for horizontal movement transversely of the aisle 606 into and out of compartments 602 with which the grab unit 692 is aligned. The carriage has an upper frame 722, and pairs of front and rear wheels 724 support the upper frame on the side rails 698 for movement of the upper frame lengthwise of these rails. The carriage also includes a lower frame 726, elevationally adjustable relative to the upper frame, constructed of a pair of side members interconnected by crossmembers with the side members having end portions projecting beyond the crossmembers. Lift cylinders 730 are secured to the upper frame and include piston rods having lower ends connected to the crossmembers of the lower frame. Thus, by actuating the lift cylinders, the lower frame is moved upward and downward toward and away from the upper frame.

Clamp mechanisms 750 are mounted on the carriage 720 for grasping and releasing a container 760. More specifically, a pair of clamp mechanisms is pivotally mounted at each end of the lower frame 726 of the carriage and is adapted to connect to the top portion of the container. The clamp mechanisms are pivoted by suitable electromechanical control mechanisms, not shown. Upon actuation of such control mechanisms and with the lower frame positioned over a container 760, the hooks are pivoted between clamping positions fitted in end sockets of a container and retracted positions out of said sockets and with the hooks projecting endwardly of the carriage above the container.

Motor-operated drive mechanisms, not shown, are mounted on the upper frame 722 of the carriage 720 and have driving connection to the wheels 724 for moving the carriage between a retracted position within the C-brackets 694 and a projected position within a compartment 602, the wheels in the latter position riding along the compartment rails 604 which are aligned with the hoist rails 698 thereby to transfer a container between the hoist and the compartment.

Movement of the hoist horizontally and vertically, of the carriage into and out of the compartments, and of the clamp mechanisms is controlled from the cab 770 or semiautomatically or automatically as with the first form of the crane.

The embodiments of the crane described and illustrated herein are especially advantageous in their ability to handle large, heavy loads such as van-type containers. The features of the invention that are particularly noteworthy are the ability of the crane to move the load up and down relative to the carriage, whether within the compartment, or other load receiving area, at the transfer station, or at other locations. With this feature, it is unnecessary to move the entire cage up and down in order to impart similar movement to the load. Another feature of significance is the ability of the crane to handle loads from the top, as contrasted with supporting the load from the bottom as by inserting fingers under the load or by placing the load on some elevationally movable support surface. Furthermore, the mechanism for moving the loads into and out of the load supporting area of the storage facility so as to provide dependable support for the load at all times is an important feature. In general, the various components of the crane are interrelated to perform the foregoing and other functions rapidly, dependably, and on either a semiautomatic or automatic basis.

Having described the invention, what is claimed as new and sought to be secured by Letters Patent is as follows:

1. In a crane for elevationally moving a generally rectangular load such as a van-type freight container, a cage having longitudinally spaced pairs of dependent leg elements with the leg elements of each pair being spaced transversely of each other and with said leg elements being provided with foot portions, substantially horizontally arranged rail means disposed on the foot portions of said spaced leg elements and providing a trackway for a carriage, a carriage, means movably mounting the carriage on said trackway and within said cage, lifting unit means mounted within and attached to a selected portion of said carriage, lock means carried by said lifting unit means for releasably and selectively engaging a van-type freight container in the area of the top thereof and for dependingly supporting the container between said leg elements and from said carriage, and said lifting unit means being adapted to raise and lower said container engaging lock means along with a van-type freight container relative to the selected portion of the carriage, means for raising and lowering said cage and for laterally transporting said cage along with the carriage and a van-type freight container suspended from the carriage and means for moving said carriage along said trackway and for projecting the carriage out of said cage.

2. A crane as set forth in claim 1 wherein said carriage is comprised of interconnected frame elements one of which constitutes said lifting unit means.

3. A crane as set forth in claim 1 wherein said releasable lock means comprises a twist lock means on the carriage.

4. A crane as set forth in claim 1 wherein said releasable lock means comprise clamp mechanisms.

5. A crane as set forth in claim 1 wherein said releasable lock means comprise downwardly projecting hoodlike elements which fit within socket means on the top of the vanlike container.

6. A crane as set forth in claim 1 wherein said carriage includes interconnected telescoping frames.

7. A crane as set forth in claim 6 wherein said lifting unit means is attached to one of said telescoping frames.

8. A crane as set forth in claim 7 wherein said lock means comprise a twist lock means on the carriage.

9. A crane device for moving a generally rectangular load such as a van-type freight container in a plurality of planes comprising the combination of a container engaging carriage, a cage for mounting the carriage, said cage having longitudinally spaced pairs of dependent legs with legs of each pair being spaced transversely of each other, foot portions on said legs, horizontally arranged rail members mounted on the foot portions of said spaced legs and providing a trackway for the carriage, means movably mounting the carriage on said trackway intermediate said legs and within said cage, lifting unit means mounted within and attached to a selected portion of said carriage, releasable lock means carried by said lifting unit means for releasably and selectively engaging the top portions of a van-type container and for dependingly supporting the container between said legs and from said carriage, and said lifting unit means being adapted to raise and lower said container engaging lock means along with a van-type freight container relative to the selected portion of the carriage, means for raising and lowering said cage and for moving said cage in a plane transverse to a vertical plane, means for moving the carriage along said trackway so as to project the carriage out of the cage along with the container suspended from the carriage and means associated with the foot portions of the carriage for initially guiding the container into releasable engagement with the lock means on the carriage as the cage is moved along with the carriage into position about the container.

10. A crane device as set forth in claim 9 wherein said guide means comprise camlike elements on the foot portions of the carriage.

11. A crane device as set forth in claim 9 wherein said releasable lock means comprises a twist lock means on the carriage.

12. A crane device as set forth in claim 10 wherein said releasable lock means comprises a twist lock means on the carriage.

13. A crane device as set forth in claim 9 wherein said releasable lock means comprise clamp mechanisms.

14. A crane device as set forth in claim 9 wherein said releasable lock means comprise downwardly projecting hooklike elements which fit within socket means on the top of the vanlike container.

15. A crane device as set forth in claim 9 wherein the carriage comprises interconnected frame elements one of which constitutes said lifting unit means.

* * * * *